United States Patent [19]

Nakamura et al.

[11] Patent Number: 5,575,915
[45] Date of Patent: Nov. 19, 1996

[54] METHODS OF REMOVING SILVER

[75] Inventors: Takashi Nakamura; Yasuhiro Nakayama; Haruhiko Iwano; Hideo Miyazaki, all of Kanagawa, Japan

[73] Assignee: Fuji Photo Film Co., Ltd., Kanagawa, Japan

[21] Appl. No.: 458,261

[22] Filed: Jun. 2, 1995

[30] Foreign Application Priority Data

Jun. 10, 1994 [JP] Japan ............................ 6-129048

[51] Int. Cl.$^6$ .................. C02F 3/02; C02F 1/56; C02F 1/62
[52] U.S. Cl. .................. 210/631; 210/727; 210/732; 210/912; 210/688; 210/651; 210/652; 210/729
[58] Field of Search ..................... 210/732, 650, 210/651, 652, 729, 735, 688, 727, 631, 912

[56] References Cited

U.S. PATENT DOCUMENTS

| | | | |
|---|---|---|---|
| 4,670,160 | 6/1987 | Moriya et al. | 210/728 |
| 4,874,530 | 10/1989 | Kobayashi et al. | 210/912 |
| 4,940,134 | 7/1990 | Aoki et al. | 210/774 |
| 5,164,095 | 11/1992 | Sparapany et al. | 210/912 |
| 5,205,939 | 4/1993 | Syrinek | 210/912 |
| 5,288,728 | 2/1994 | Spears et al. | 210/729 |
| 5,296,111 | 3/1994 | Suzuki et al. | 210/748 |
| 5,347,071 | 9/1994 | Moriya et al. | 210/728 |
| 5,350,522 | 9/1994 | Fyson | 210/912 |
| 5,437,792 | 8/1995 | Szembrot et al. | 210/729 |

FOREIGN PATENT DOCUMENTS

| | | | |
|---|---|---|---|
| 3-132656 | 6/1991 | Japan | G03C 7/44 |
| 6-258779 | 9/1994 | Japan | G03C 5/00 |

*Primary Examiner*—Neil McCarthy
*Attorney, Agent, or Firm*—Sughrue, Mion, Zinn, Macpeak & Seas

[57] ABSTRACT

A method of removing silver from a solution containing silver halide and silver ion is described, which comprises a step of adding an a sulfur atom-containing hydrophilic polymer chelating agent to the solution.

11 Claims, 3 Drawing Sheets

METHODS OF REMOVING SILVER

FIELD OF THE INVENTION

The present invention relates to methods of removing silver from solutions containing silver halide and silver ion and, more particularly, to methods of removing silver from silver-containing waste solution generated in the process of manufacturing photosensitive materials.

BACKGROUND OF THE INVENTION

Like other industries, waste volume increases with the production scale in photo industry. As far as the amount of waste discharged from the industry is less than the threshold that can be managed by the natural environment, i.e., less than the environmental capacity, it does not generate any problem, however it does cause a problem when the amount exceeds the capacity. Therefore, it becomes necessary to reduce the quantity of wastes within the natural environmental capacity although it is proper that the wastes increase in quantity as the photographic industry prospers.

It is water pollution that becomes the major issue in the photographic industry. Recently, the standards of discharging silver into sewer have been regulated more severely with the years from the standpoint of preserving environment.

As for the regulations relating to the silver-discharge standards in the waste water discharged from a factory of photographic light-sensitive materials or the wash water of photographic processing, descriptions thereof can be found, e.g., in *"Information Ecology and Safety" Regulations Affecting the Discharge of Photographic Processing Solutions*, Kodak Publication No. J-102 (September, 1990). Table 1 thereof sets forth the value of 0.001–20 ppm as the silver-discharge standards of the sewerage regulation in a typical city; while the regulated value of silver in a photofinishing laboratory is reported as 0.5–5 ppm in Table 2 thereof. Some states of America are even of regulation that the discharge standards of silver should be less than 0.02 ppm.

Also, there can be found the regulated value of silver in the acts enacted in U.S.A. in 1986, such as "Safe Drinking Water Act", "Hazardous Materials Transportation Act", "Toxic Substances Control Act" and so on. Further, the regulations of sewer in U.S.A. becomes severe in many regions in response to the operation of "Revision of Clean Water Act" in 1989.

In addition, Europe also has severe regulations, and the standards of discharging silver into sewer is not more than 0.1 ppm.

Accordingly, it has been desired to invent a method of removing silver to such an extent as to satisfy the severe standards cited above, especially an effective method of reducing a silver concentration to 1 ppm or less, and discover an art of efficiently removing silver while keeping down the cost of a disposal plant which can cope with the severe discharge standards.

SUMMARY OF THE INVENTION

Therefore, an object of the present invention is to provide a method of removing silver from a solution containing silver halide, silver ion and the like to make the silver concentration extremely low (not more than several ppm), and enabling an efficient removal of silver and a great reduction of disposal plant cost.

The above-described object is attained by the following constitutions from (1) to (15):

(1) A method of removing silver by adding a sulfur atom-containing hydrophilic polymer chelating agent to a solution containing silver halide and silver ion.

(2) A method of removing silver as described in the constitution (1), wherein the sulfur atom-containing hydrophilic polymer chelating agent as described in the constitution (1) is a water-soluble sulfur atom-containing hydrophilic polymer chelating agent which contains at least one group selected from among a dithiocarbamate group, a thiocarboxyl group, a dithiocarboxyl group, a dithiocarbaminic acid group and a thiol group.

(3) A method of removing silver as described in constitution (2), wherein the silver is removed by adding an anionic, nonionic or cationic organic polymer precipitant or a combination thereof before, after or during the addition of the sulfur atom-containing hydrophilic polymer chelating agent as described in the constitution (2).

(4) A method of removing silver as described in constitution (2), wherein the silver is removed by adding an inorganic salt or metallic precipitant under a controlled pH before, after or during the addition of the sulfur atom-containing hydrophilic polymer chelating agent as described in the constitution (2).

(5) A method of removing silver as described in constitution (2), wherein the solution containing silver halide and silver ion undergoes pre-sedimentation with an inorganic precipitant and/or an organic polymer precipitant, the supernatant is separated therefrom, and then the sulfur atom-containing hydrophilic polymer chelating agent as described in the constitution (2) is added to the supernatant in an amount of from 100 to $1/100$ equivalent with respect to the molar amount of whole silver in the supernatant, thereby removing the silver.

(6) A method of removing silver by feeding a solution containing silver halide and silver ion into an activated sludge tank and adding the sulfur atom-containing hydrophilic polymer chelating agent as described in the constitution (2) before, during or subsequently to the treatment with the activated sludge.

(7) A method of removing silver as described in the constitution (6), wherein the solution containing silver halide and silver ion is fed into the activated sludge tank and an inorganic precipitant and/or an organic polymer precipitant is added before or during the treatment with activated sludge.

(8) A method of removing silver by feeding a solution containing silver halide and silver ion into an activated sludge tank and passing the solution through a single membrane MF filter during or continuously to the treatment with activated sludge.

(9) A method of removing silver as described in the constitution (8), wherein the single membrane MF filter as described in the constitution (8) has an average pore diameter of 0.05 to 1 μm, at least 75% of the filter membrane surface is not fixed, thereby rendering the filtering plane vibratile, and the silver is removed under a low pressure of 1 Kg/cm² or less.

(10) A method of removing silver as described in the constitution (8), wherein after feeding the solution containing silver halide and silver ion into the activated sludge tank and treating it with the activated sludge, the supernatant produced therefrom is sterilized and then passed through the single membrane MF filter.

(11) A method of removing silver as described in the constitution (2), wherein after precipitating and separating out silver by the addition of the sulfur atom-containing hydrophilic polymer chelating agent as described in the constitution (2), the solution separated is filtered under a low pressure of 1 Kg/cm$^2$ or less by passing it through a single membrane MF filter which has a pore diameter of from 0.05 to 1 μm and a membrane surface at least 75% of which is unfixed to render the filtering plane vibratile.

(12) A method of removing silver from a large quantity of waste solution by adding the sulfur atom-containing hydrophilic polymer chelating agent as described in the constitution (2) to a solution containing silver halide and silver ion to precipitate and separate out silver, treating the resulting solution with activated sludge and then filtering through a single membrane MF filter under a low pressure of 1 Kg/cm$^2$ or less.

(13) A method of removing silver as described in the constitution (2), comprising the addition of a hydrophilic polymer chelating agent containing sulfur atoms in a proportion equimolar or more with the whole silver in the solution containing silver halide and silver ion.

(14) A method of removing silver by filtering the solution which has undergone the treatment as described in the constitution (2), (13) or (8) while bubbling air therethrough.

(15) A method of removing silver by detecting the turbidity of a solution containing silver halide and silver ion, and adding a sulfur atom-containing hydrophilic polymer chelating agent to the solution in an amount determined depending on the turbidity detected (according to a look-up table).

In accordance with the aforementioned constitutions of the present invention, silver can be removed efficiently.

DETAILED DESCRIPTION OF THE INVENTION

Figure 1A:
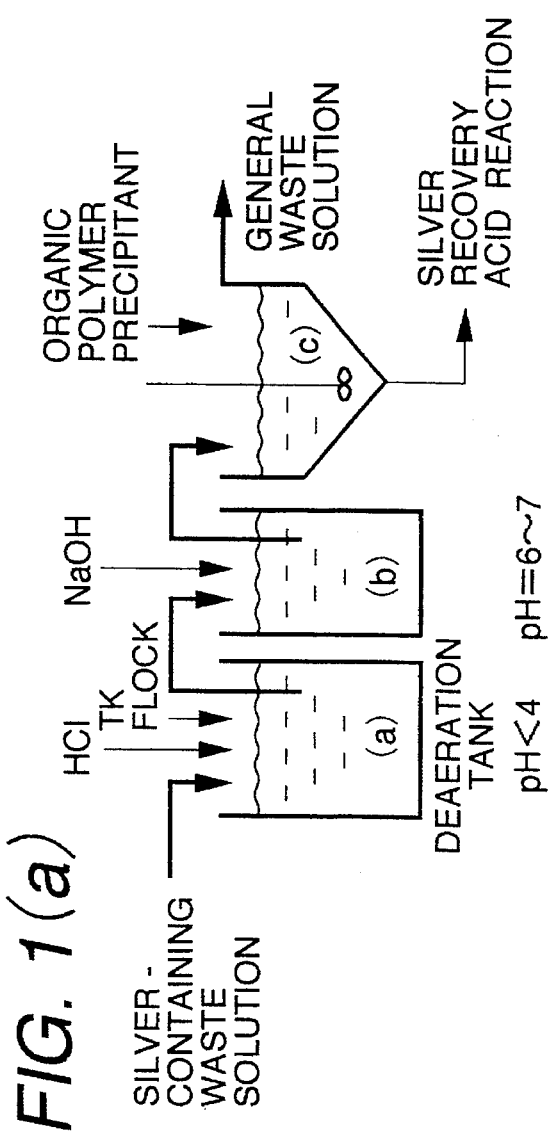
FIGS. 1(a) and 1(b) show two embodiments of the method adopted in Examples of the present invention and preferred as the silver-removing method of the present invention.

The words "a solution containing silver halide and silver ion" used in the present invention means a solution containing silver halide emulsion ("silver-containing solution" hereinafter). Silver halide emulsion contains not only silver halide grains but also silver halide and silver-halo complexes in dissolved states since it contains an excess of halide ions and equilibriums among silver halide grains, dissolved silver ion, silver-halo complexes, and halide ions introduces various silver-halo species in the aqueous system. That is, a finished emulsion generally contains excess halogen, and so the pAg thereof is greater than 8. Accordingly, solid silver halide is dissolved in a proportion balanced with the difference in pAg from 8 to result in presence of silver halide, silver ion and silver-halo complexes.

More specifically, silver halide and silver ion in a proportion on a level of $10^{-2}$ to $10^{-6}$ mole to the silver halide are dissolved in a silver halide emulsion. In this application, the term "silver ion" includes dissolved silver-halo species. This concentration is changed depending on the quantity and the type of a surrounding solvent (halogen in this case). Further, it depends on the kind of the silver halide emulsion. In disposing of an emulsion as waste, it sometimes happens that the emulsion is diluted with water and the water used contains other solvents as impurities, and so it can be supposed that the emulsion exists in a complex form. Also, it sometimes contains other metals. In particular, an subject of the present invention is a waste solution which generates in preparing photosensitive materials and contains silver halide present in gelatin and silver dissolved as silver ion.

In the present invention, a sulfur atom-containing hydrophilic polymer chelating agent is added to a silver-containing solution to produce —SAg group by the reaction between the —SH group in the hydrophilic polymer chelating agent and the silver ion in the silver-containing solution, thereby solidifying the dissolved silver. Since the reaction of Ag$^+$ with —SH group proceeds very rapidly, silver ion can be removed efficiently from the silver-containing solution. Further, the silver halide in the silver-containing solution is coprecipitated with the solidified matter produced by the reaction between Ag$^+$ and the —SH group.

The term "sulfur atom-containing hydrophilic polymer chelating agent" as used herein refers to the sulfur atom-containing hydrophilic, preferably water-soluble, liquid polymer having a linear structure. (The words "sulfur atom-containing" may be abbreviated as "S-containing" hereinafter). According to a conceptional description, the S-containing hydrophilic polymer chelating agent is a chelating agent of the polymer type which contains one water-soluble S-containing group, e.g., a thiol group (—SNa), a thiocarboxyl group (—C(=O)—SNa), a dithiocarboxyl group (—C(=S)—SNa) or a dithiocarbaminic acid group (—NHC(=S)—SNa), per 1 to 4 carbon atoms (molecular weight: $5 \times 10^4$ to $6.0 \times 10^5$, preferably $1.0 \times 10^5$ to $2.5 \times 10^5$) and further enables the use in a water-soluble state (which is distinct from the state of the so-called solid particles like an ion exchange resin). Of the water-soluble S-containing groups, the most favorable one is a dithiocarbaminic acid group.

Also, the chelating agent may be an emulsified dispersion of hydrophilic S-containing polymer even if the polymer itself is insoluble in water.

In addition, the chelating agent may be a polymer containing one hydrophilic S-containing group per 1 to 4 carbon atoms so far as the polymer has water-soluble fragments (e.g., fragments in which a nitrogen, oxygen or sulfur atom is introduced, such as —C—C—O—C—C—, —C—C—S—C—C—, —C—C—N—C—C—, etc.) introduced in the chain of its linear structure.

The chelating agent can approach silver ion to react with each other owing to the hydrophilic property thereof (preferably solubility in water, more preferably liquid character) even if silver halide and silver ion are in a complex state of existence. Thus, the liquid chelating agent draws silver ion to become insoluble in water, and so it precipitates and separates out. As a result, the removal of silver can be achieved with an easy means. More specifically, the separation can be effected with ease by a low-priced single membrane MF filter.

In view of accelerating the sedimentation speed and the growth of precipitated particles, it is desirable that an anionic, nonionic or cationic organic polymer precipitant or a combination thereof be added to a silver-containing solution before, after or during the addition of the S-containing hydrophilic polymer chelating agent.

As for the organic polymer precipitant used in the present invention, the polymerization degree thereof, though it may be low or high, is preferably high. The organic precipitant having a high polymerization degree is preferably any of anionic, cationic and nonionic ones.

Examples of an anionic organic polymer precipitant include partly hydrolyzed products of polyacrylamide or polyacrylonitrile, vinyl acetate-maleic anhydride copolymers, polyacrylic acid, alginic acid, CMC (carboxymethyl cellulose), CMS (carboxymethyl starch) and alkali starch, which each contain $COO^-$ ion and form the sodium or ammonium salt; and sodium polystyrenesulfonate which contains $SO_3^-$ ion.

Examples of a cationic organic polymer precipitant include polyvinylpyridine hydrochloride, vinylpyridine copolymer salts, polysoaps as described in *Chinden Nohshuku* (which means "Precipitation Condensation"), Series No. 13, revised and enlarged edition, page 29, cationic starch and so on.

Examples of a nonionic organic polymer precipitant include polyacrylamide, polyoxyethylene, polysaccharide and so on.

As other organic polymer precipitants which can be used in the present invention, mention may be made of those described in *Chinden Nohshuku*, Series No. 13, revised and enlarge edition (published in Jun. 23, 1989).

The organic polymer precipitants may be added after the reaction of silver with the hydrophilic polymer chelating agent is completed, or it may be added prior to or simultaneously with the addition of the hydrophilic polymer chelating agent, or during the course of the reaction of silver with the hydrophilic polymer chelating agent. In a case of adding them independently, it is preferable for the organic polymer precipitant to be added after the addition of the S-containing hydrophilic polymer chelating agent.

When anionic, cationic and nonionic precipitants are added in combination of two or more thereof, on the other hand, it is desirable that they be added prior to the addition of the S-containing hydrophilic polymer chelating agent and further added to the supernatant separated after the precipitation.

The combined use of an organic polymer precipitant with a S-containing hydrophilic polymer chelating agent enables a reduction of running cost because a reduced amount of S-containing polymer chelating agent which is an expensive chemical can serve for the purpose and, what is more, makes it possible to lower the achievable removal level of silver to a remarkable extent.

From the standpoints of accelerating the sedimentation speed and the growth of precipitated particles, it is also desirable to add an inorganic salt or metal as an inorganic precipitant under a controlled pH before, after or during the addition of the S-containing hydrophilic polymer chelating agent. The expression "under a controlled pH" as used herein means that the pH is adjusted to from 2 to lower than 6 by the addition of an acid before adding an inorganic precipitant to the silver-containing solution, while it is adjusted to from 6 to 8 by the addition of an alkali after adding the inorganic precipitant to the silver-containing solution.

As for the inorganic precipitants used in the present invention, inorganic salts and metals (electrolytic metal products) are preferred.

Examples of an inorganic salt precipitant include aluminum sulfate, basic aluminum chloride, sodium aluminate, ferric sulfate, ferrous sulfate, ferric chloride, calcium chloride and so on.

Examples of a metal precipitant include electrolytic aluminum hydroxide, electrolytic iron hydroxide and so on.

Examples of other inorganic precipitants which can be used in the present invention include those described in *Chinden Nohshuku*, Series No. 13, revised and enlarge edition (published in Jul. 23, 1989).

The combined use of an inorganic precipitant and an S-containing hydrophilic polymer chelating agent in the present invention enables effective removal of metals other than silver, too. In addition, the combined use is advantageous, because it can lower the achievable removal level of silver and reduce the running cost.

The inorganic precipitant may be added at the conclusion of the reaction of silver with an S-containing hydrophilic polymer chelating agent, or prior to or simultaneously with the addition of an S-containing hydrophilic polymer chelating agent, or in the process of reaction between silver and an S-containing hydrophilic polymer chelating agent. Preferably, an inorganic precipitant is added before the addition of an S-containing hydrophilic polymer chelating agent. Therein, it is desirable that the inorganic precipitant added be completely dissolved, e.g., under an acidic condition and converted to precipitates of metal hydroxides by neutralization. Further, the precipitates are separated therefrom and the residual solution is admixed with an S-containing hydrophilic polymer chelating agent.

The organic polymer precipitant and the inorganic precipitant are each added in an amount of from 1 to 100 equivalents per equivalent of silver. The amount of each precipitant added is preferably in the range of 10 to 100 equivalents when each of them is added before the addition of the S-containing hydrophilic polymer chelating agent, it is preferably in the range of 1 to 5 equivalents when each of them is added during the addition of the S-containing hydrophilic polymer chelating agent, and it is preferably in the range of 1 to 10 equivalents when each of them is added after the addition of the S-containing hydrophilic polymer chelating agent. In the case of adding the organic polymer precipitant and the inorganic precipitant before the treatment with activated sludge, on the other hand, it is preferable for each precipitant to be added in an amount of 10 to 100 equivalents per equivalent of silver. In the case of adding them during the treatment with activated sludge, the amount of each precipitant added is preferably in the range of 1 to 5 equivalents.

From the standpoint of complete removal of silver-, it is desirable that the amount of functional sulfur atom in the S-containing hydrophilic polymer chelating agent be not less than equimolar with the whole dissolved silver in the silver-containing solution.

The total number of moles of silver in the silver-containing solution can be determined by the measurement with a pAg meter or by turbidimetry. Based on the thus determined value, the amount of the S-containing hydrophilic polymer chelating agent to be added is controlled. On the other hand, the amount of the S-containing hydrophilic polymer chelating agent to be added may be calculated using a look-up table.

When an S-containing hydrophilic polymer chelating agent is used alone, it is desirable to add it in an amount of from 0.5 to 4 equivalents, preferably from 0.5 to 2.7 equivalents and more preferably from 0.7 to 2.3 equivalents, per equivalent of silver (the sum of the molar amount of silver halide and the molar amount of silver ion or if the size of silver halide is larger one, the molar amount of silver halide is neglected because silver halide precipitate with Ag ion-S-polymer precipitates) in the silver-containing solution. When the amount of the chelating agent added is smaller than 0.5 equivalent, a significant amount of silver ions fail to coordinate to the S-containing hydrophilic polymer chelating agent, and so the silver remaining in, the filtrate increases in quantity. When the amount of the chelating agent added is greater than 4 S/Ag in equivalent, on the other hand, silver ions coordinating to each molecule of the S-containing hydrophilic polymer chelating agent are reduced in number. As a result of it, the formed complex of silver and the chelating agent (polymer-metal complex) cannot be deposited as precipitates, and so the polymer-metal complex is passed through a filter resulting in insufficient removal of silver.

In the case of adding an S-containing hydrophilic polymer chelating agent to the solution after separating out the precipitates generated by adding an organic polymer precipitant and/or an inorganic precipitant prior to the addition of the S-containing hydrophilic polymer chelating agent, the amount of the chelating agent added is in the range of 100 to 1/100 equivalent, preferably 1 to 10 equivalents, more preferably 1 to 5 equivalents and particularly preferably 1 to 4 equivalents, per equivalent of dissolved silver.

Further, when the ratio of an S-containing hydrophilic polymer chelating agent to dissolved silver (Ag) is much greater than 1 by equivalent ratio, it is effective to supplement the silver with an alkaline earth metal (M) so that the ratio of the S-containing hydrophilic polymer chelating agent to the sum of dissolved Ag and M may be less than 1 by equivalent ratio. Although organic polymer or inorganic precipitants which can be used in the present invention are also called flocculants, the term "precipitants" is adopted in the present invention.

Performing the treatment as shown in FIG. 1(a) is advantageous since it enables the removal of silver to an undetectable extent at a reduced cost, wherein solid silver in an emulsion waste solution, such as silver halide and colloidal silver, is precipitated by pre-sedimentation (e.g., as described in the experimental (2) of Example 2), and then the silver in an ionic state (e.g., $AgX_n^-$ (20>n≧3; X=Cl, Br, I)) and $AgY_m^-$ (20>m≧2; Y=$S_2O_3^{2-}$, $SO_3^{2-}$) are settled with an S-containing hydrophilic polymer chelating agent as a hitherto known organic polymer and/or inorganic precipitants is further added thereto at the same time as or at the latter half of the addition of the S-containing hydrophilic polymer chelating agent.

In removing silver according to the present invention, the solution containing silver halide and silver ion is fed to an activated sludge tank and the S-containing hydrophilic polymer chelating agent is added to the activated sludge tank before, during or subsequently to the treatment with activated sludge. The expression "during the treatment with activated sludge" as used herein is intended to also include a period for aeration of the activated sludge tank, and the expression "subsequently to the treatment with activated sludge" describes a period from immediately after the conclusion of aeration.

It is advantageous to carrying out the treatment with activated sludge and the addition of an S-containing hydrophilic polymer chelating agent in combination, because it enables the removal of silver on a lower level, and so coping with regulations by a wide margin becomes possible.

The activated sludge process is a process taking advantage of aerobic microorganisms in a state of mixed culture to decompose and remove organic matter in a waste solution. For details of such a process, there can be referred to a book entitled "Suishitsu Odaku Bohshi Gijutsu to Sohchi 4. Seibutsugakuteki Mizushori Gijutsu to Sohchi" (which means "Water Pollution Preventing Arts and Apparatuses, volume 4, with a subtitle of Biological Water Treatment Arts and Apparatuses"), published by Baifukan on Sep. 30, 1988.

The treatment with activated sludge is a method widely used for treating a general waste water, e.g., raw sewage, wherein biological activities of sludgy microorganisms are heightened by aeration to result in reduction of nutriment in the waste water, that is, to diminish BOD and COD components in the waste water. Thus, it becomes possible to discharge the waste water treated by the above-described method water into river and sea. The microorganisms present in the activated sludge tank have a great deal of ability to capture silver inside or around the surface of their bodies. Accordingly, when the treatment with activated sludge and the addition of a sulfur atom-containing hydrophilic polymer chelating agent are carried out in combination, excellent silver-removing power can be achieved.

Further improvement in silver-removing power can be effected by not only carrying out the addition of an S-containing hydrophilic polymer chelating agent before, during or continuously to the treatment with activated sludge, but also adding an inorganic precipitant and/or an organic polymer precipitant before or during the treatment with activated sludge.

As for the way of adding the above-described additives, in the case of using an inorganic precipitant, it is desirable that an inorganic precipitant first, and then an organic polymer precipitant be added to a waste solution with stirring, the thus produced precipitates be settled and separated out, and the residual solution (supernatant or filtrate) undergoes the treatment with activated sludge (including aeration) before, during or after the separation by sedimentation which is caused by the addition of an S-containing hydrophilic polymer chelating agent.

In the case of using organic polymer precipitants alone, it is desirable that at least two kinds of organic polymer precipitants chosen from anionic, nonionic and cationic ones be added to a waste solution with stirring, the thus produced precipitates be settled and separated out, and the residual solution (supernatant or filtrate) undergoes the treatment with activated sludge (including aeration) before, during or after the separation by sedimentation which is caused by the addition of an S-containing hydrophilic polymer chelating agent.

In the present invention, a solution containing silver halide and silver ion is fed to an activated sludge tank, and passed through a single membrane MF filter to remove silver therefrom during or continuously to the treatment with activated sludge. The term "a single membrane MF filter" as used in the present invention means a filter made of a simple membrane, that is, a mono-layer filter, which is exclusive of a laminate of at least two filters different in materials, such as a reverse osmosis membrane and an ultrafiltration membrane. The term "MF" as used in the present invention means a microfilmer. When the treatment with activated sludge and the filtration treatment with a single membrane filter are carried out in combination, silver is captured by microorganisms in the activated sludge tank, thereby enabling the removal of silver by filtration.

For carrying out the treatment with activated sludge and the filtration treatment at the same time, it is desirable to place the filter in the activated sludge tank. By doing so, conventional equipments can be utilized, which leads to a reduction in equipment cost. In carrying out the filtration treatment continuously to the treatment with activated sludge, it is desirable that the supernatant in the activated sludge tank be fed into a tank next to the activated sludge tank and therein be subjected to the filtration treatment. This is because it becomes easy to prevent the filter from stopping by admitting the supernatant to the other tank, resulting in an increase of filtration efficiency.

The single membrane MF filter which can be used in the present invention is a filter having an $S_2/S_1$ ratio of from $10^3$ to $10^5$, wherein $S_1$ stands for the filter penetration aperture area, that is, a cross section of filter penetration holes and $S_2$ stands for the filter membrane surface area. More specifically, the filter penetration aperture constitutes the fixed part, and the other filter membrane surface the unfixed part. Accordingly, this single membrane has a fixation rate of less than 0.1%, conversely an unfixation rate of at least 99.9%.

There are several kinds of filters which can satisfy the foregoing condition. For instance, a hollow-fiber single membrane MF filter and a bag-form single membrane MF filter can be used. Suitable examples of a hollow-fiber single membrane MF filter include filters having a pore diameter of 0.01 to 10 μm, preferably 0.03 to 3 m, and more preferably 0.05 to 1 μm, such as Kuraray SF filter (made from polyvinyl alcohol and having a pore diameter of 0.1 m), produced by Kuraray Co., Ltd., SR-205 (made from polyolefin and having a pore diameter of 0.1 μm), produced by Asahi Chemical Industry Co., Ltd., E202AE (made from a fluororesin and having a pore diameter of 0.2 μm), produced by Nitto Electric Industry Co., Ltd., and Sterapore STNM424 (made from polyethylene and having a pore diameter of 0.1 μm), produced by Mitsubishi Rayon Company Limited. In particular, Sterapore STNM424 is preferred over the others. As for the bag-form single membrane MF filter, YC-25 (25 m$^2$) having a pore diameter of 0.45 μm, YC-50 (50 m$^2$) having a pore diameter of 0.45 μm and YC-100 (100 m$^2$) having a pore diameter of 0.45 μm, which are all the products of Yuasa Corporation, are examples thereof. Of these products, YC-50 is particularly preferable in view of price and maintenance, although the most suitable one should be chosen depending on the purpose in using it.

As described above, there are many kinds of hollow-fiber single membrane MF filters. However, those preferred in the present invention are filters made from polyethylenes and polypropylenes because they can easily vibrate by air bubbles.

The average pore diameter of a single membrane MF filter which can be used is in the range of 0.05 to 1 μm, preferably 0.05 to 0.3 μm, and more preferably 0.06 to 0.2 μm.

When the average pore diameter of the filter is less than 0.05 μm, it becomes difficult to make the filter with a single membrane. If the filter is made with a multiple membrane, on the other hand, the cost thereof becomes high and it occurs readily that precipitates stop up the filter. When the average pore diameter of the filter is greater than 1 μm, the sediment and the suspended matter in the solution (e.g., $Ag_2S$, activated sludge silver) are easily to pass through the filter, thereby failing in removal of silver.

By treating the silver-containing solution with an activated sludge tank, there can be brought about such a condition that the silver is captured by microbes in the activated sludge tank. Therefore, the removal of silver from the supernatant obtained after the treatment with the activated sludge becomes possible by means of filtration. Hitherto, it was impossible to remove silver ion by filtration even when filters applicable to the present invention were used, and so the silver ion concentration in the filtrate was not lowered. However, the combination of the treatment with activated sludge and the filtration enables a considerable reduction of the silver concentration in the filtrate.

The filter is placed in an activated sludge tank so that it may partly be fixed and partly be rendered vibratile. Unless the filter is partly fixed, it is impossible to set up the filter in the tank. When part of the filter is vibratile, on the other hand, adhesion of activated sludge and suspended matter to the filtering plane can be diminished, and so the filter can be used for a long time as it is, or without undergoing any maintenance.

The pressure applied to make the solution passed through a single membrane MF filter for the removal of silver therefrom is a low pressure of 1 Kg/cm$^2$ or less. It is more desirable in the present invention to apply the lower pressure to the filter. More specifically, the pressure in the range of 0.05 to 0.9 Kg/cm$^2$ is preferable, and the pressure in the range of 0.1 to 0.8 Kg/cm$^2$ is more preferable.

When the pressure at the time of filtration is higher than 1 Kg/cm$^2$, the precipitates penetrate into the pores of the single membrane MF filter to make it impossible to recover the filter, and so the life span of the filter is shortened and the cost of filter is raised. When the pressure is lower than 0.05 Kg/cm$^2$, on the other hand, the filtration cannot be effected.

After the treatment defined by the foregoing constitutions (2), (13) or (8), it is desirable in the present invention that the waste solution be passed through the filter with bubbling.

The filtration under a bubbling condition can prevent the filter from stopping, thereby improving the filtering efficiency.

After the treatment with activated sludge, the supernatant is sterilized, and then passed through a single membrane MF filter as the pressure of no higher than 1 Kg/cm$^2$ is applied thereto. By taking such a step, the tacky adhesion of the activated sludge to the filter surface can be prevented, and so the filter can be used for a long time unless any measure for maintenance is taken.

As for the sterilization treatment which can be adopted in the present invention, ozone oxidation, UV irradiation and the addition of hypochlorites are examples thereof.

After precipitating and separating out silver by the addition of the S-containing hydrophilic polymer chelating agent to the silver-containing solution, the solution separated is filtered under a low pressure of 1 Kg/cm$^2$ or less by passing it through a single membrane MF filter which has a pore diameter of from 0.05 to 1 μm, a membrane surface at least 75% of which is unfixed, thereby rendering the filtering plane vibratile, and further a ratio of the area of a filter membrane surface ($S_2$) to the area of a filter penetration aperture ($S_1$), namely an $S_2/S_1$ ratio, ranging from $10^2$ to $10^6$, preferably from $10^3$ to $10^5$. The filtration treatment as described above is desirable for the purpose of markedly lower the level of silver removal.

The expression "a membrane surface at least 75% of which is unfixed, thereby rendering the filtering plane vibratile" means that at least 75% of the area ($S_2$) of the filter membrane surface, which is capable of transmitting water, is in a vibratile state, but the residual membrane surface may be in a fixed state similarly to the filter penetration aperture.

Figure 5A:
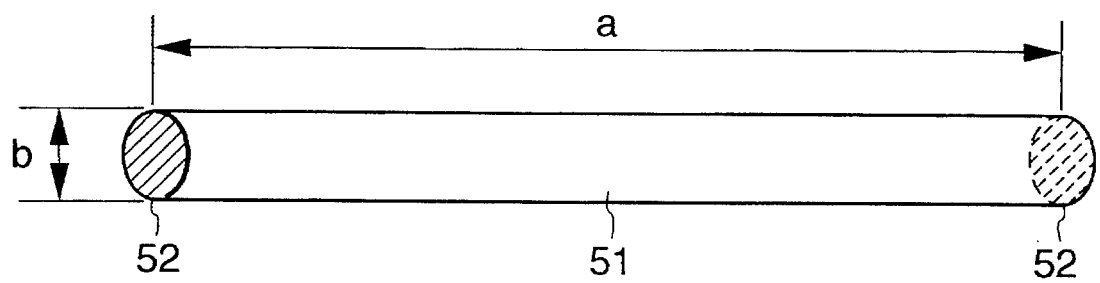
FIGS. 5(a) and 5(b) show an embodiment of the single membrane MF filter which can be preferably used in the silver-removing method of the present invention.

As embodiments of a single membrane MF filter which can be used in the present invention, mention can be made of those having the forms shown in FIGS. 5(a) and (b).

Figure 5B:
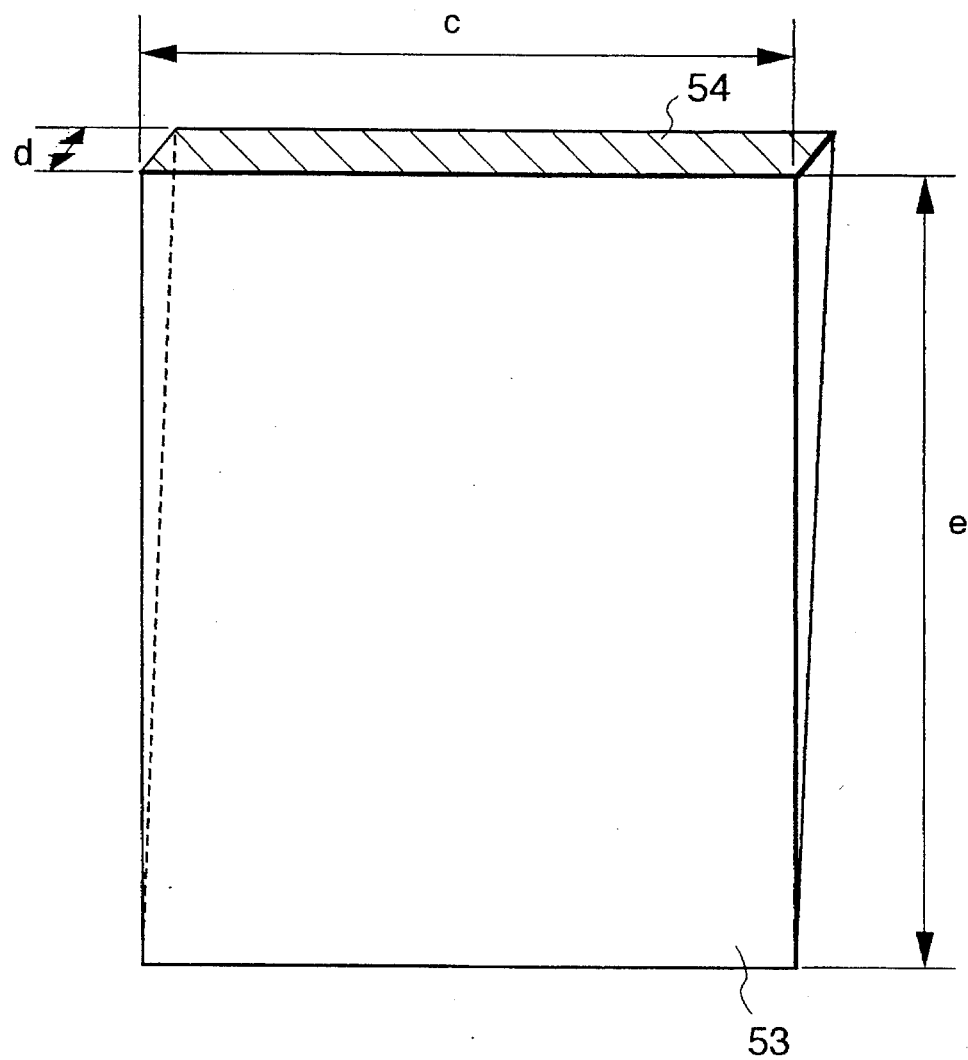

FIG. 5(a) shows a tubular hollow-fiber filter constituted of a vibratile filter membrane surface 51 and a fixed part 52 having a penetration aperture, and FIG. 5(b) a bag-form filter constituted of a vibratile filter membrane surface 53 and a fixed part 54 having a penetration aperture.

In the filter having an area of the filter membrane surface ($S_2$) which is not less than 1000 times as large as the area of the filter penetration aperture ($S_1$), the smaller area of penetration aperture part alone is fixed, and the other part is not fixed. Specifically, the filter having the fixed part in a proportion of less than 0.1% in area (that is, a fixation rate of less than 0.1%) becomes vibratile. In addition, the upper limit of $S_2/S_1$ is adjusted to below $10^5$. In case the upper limit thereof is greater than $10^5$, it becomes difficult to make the filter. This $S_2/S_1$ ratio can be determined as follows by giving concrete sizes to the constituent parts of the filters shown in FIGS. 5(a) and (b).

With respect to a hollow-fiber filter shown in FIG. 5(a), a is taken as 20 to 200 cm and b as 1 mm.

$S_1 = (0.05)^2 \times \pi \times 2 = 0.016$ cm$^2$ $S_2 = 0.1 \times \pi \times 20$ to $0.1 \times \pi \times 200 = 6.3$ cm$^2$ to 63 cm$^2$ $S_2/S_1 = 400$ to 4000

With respect to a bag-form filter shown in FIG. 5(b), e is taken as 100 cm, c as 50 cm, and d as 1 mm.

$S_1 = 0.1 \times 50 = 5$ cm$^2$ $S_2 = 100 \times 50 \times 2 = 10000$ cm$^2$ $S_2/S_1 = 2000$ As illustrated above, it is desirable that $S_2/S_1$ be in the range of $10^2$ to $10^5$. The hollow-fiber generally has a diameter of not more than 1 mm from the viewpoint of increasing the productivity, and the long hollow-fiber is usually produced from the viewpoint of increasing the efficiency. Accordingly, it is more desirable that $S_2/S_1$ be in the range of $10^3$ to $10^5$.

The MF filter is made of a 0.05 to 1 µm single membrane (which is neither a multilayer membrane such as UF membrane or RO membrane, nor a membrane which bubble size becomes gradually smaller or greater across the membrane thick direction), and so the filtering plane thereof can be easily vibrated by aeration or the like. Therefore, this filter is described as having a vibratile filtering plane. As for the form, this filter is a hollow fiber or a bag, and one end or both ends thereof are fixed but the other three sides or two sides are not fixed. As specific examples of a hollow-fiber MF filter include Sterapore STNM424 (polyethylene, pore diameter=0.1 µm), produced by Mitsubishi Rayon Company Limited, Kuraray SF filter (polyvinyl alcohol, pore diameter=0.1 µm), produced by Kuraray Co., Ltd., SR-205 (polyolefin, pore diameter=0.1 µm), produced by Asahi Chemical Industry Co., Ltd., and E202AE (fluororesin, a pore diameter=0.2 µm), produced by Nitto Electric Industry Co., Ltd. Of these filters, those made of a soft material which enables easy vibration by air bubbling, generally including polyethylenes and polypropylenes, are preferred over the others. Although the hollow fibers may be fixed at both ends or one end, those fixed at both end are favored because of their stability.

As for the bag-form filter, the products of only one maker are available. Specifically, YC-25 (polyvinyl chloride, pore diameter=0.45 µm), YC-50 (polyvinyl chloride, pore diameter=0.45 µm) and YC-100 (polyvinyl chloride, pore diameter=0.45 µm), made by Yuasa Corporation, are examples thereof. Such a filter is fixed at one end, and not fixed at other three sides. Therefore, it is stable to vibration, and readily undergoes vibrating effects. The bag-form filter has a large-size mesh spacer inserted therein, and further has an embossed filter surface. By vibrating the spacer, the vibration can be effectively transmitted to the both embossed sides of the filter without clinging to each other. By rubbing the filter surface, the adhesion of precipitates thereto during filtration can be prevented.

The present invention enables the removal of silver from a large quantity of waste solution at such a level as to be undetectable even by atomic absorptiometry or plasma emission spectrophotometry by adding the S-containing hydrophilic polymer chelating agent to a silver-containing solution to precipitate and separate out silver, treating the resulting solution with activated sludge and then passing the treated solution through a single membrane MF filter having an $S_2/S_1$ ratio of $10^3$ to $10^5$ under a low pressure of 1 Kg/cm$^2$ or less.

In removing silver by the combination of the addition of the S-containing hydrophilic polymer chelating agent, the treatment with activated sludge and the treatment with a single membrane MF filter, high power to remove silver can be attained. Therefore, such a combination is suitable for the treatment of a large quantity of silver-containing solution. Further, an equipment enabling such a treatment is of advantage in that it enables reduction in cost.

In the case of a waste solution containing silver in a low concentration, the passage of silver through a filter as cited above cannot be inhibited if the filtration is carried out after the simple addition of an S-containing hydrophilic polymer chelating agent. However, it becomes possible to filter out the silver when the addition of the foregoing chelating agent and the treatment with activated sludge are carried out in combination. As a reason thereof, it is supposed that microorganisms in the activated sludge tank capture the silver to enable the removal thereof by filtration. When a mother liquor having a silver concentration of 1 ppm is treated, for instance, the silver concentration in the filtrate is lowered to 0.001 ppm by the combination with the activated sludge treatment, while the silver of 0.07 ppm in concentration remains in the filtrate when the activated sludge treatment is omitted.

In adding an S-containing hydrophilic polymer chelating agent (the words "S-containing hydrophilic polymer chelating agent" may be abbreviated as "EP agent".), the turbidity of a silver-containing solution is detected first and, depending on the turbidity data (according to a look-up table), the amount of the agent to be added is then determined.

The detection of the turbidity of a silver-containing solution is generally performed with a commercially available turbidimeter. However, the turbidity may be determined by the measurement with a spectrophotometer using light of short wavelengths.

An example of a look-up table is given below:

| | | | linear region | | | | | non-linear region | |
|---|---|---|---|---|---|---|---|---|---|
| Turbidity | | 300 | 100 | 30 | 10 | 3 | | 2 | 1 |
| Ag concentration (ppm) | | 25 | 8 | 2.5 | 0.8 | 0.3 | | 0.1 | 0.01 |

The S-containing hydrophilic polymer chelating agent used in the present invention, which is distinct from hitherto known chelating resins, is a sulfur atom-containing hydrophilic (preferably water-soluble, more preferably liquid) polymer having a linear structure.

In a conception, the S-containing hydrophilic polymer chelating agent is a polymer type which contains one water-soluble S-containing group, e.g., a thiol group (—SNa), a thiocarboxyl group (—C(=O)—SNa), a dithiocarboxyl group (—C(=S)—SNa) or a dithiocarbaminic acid group (—NHC(=S)—SNa), per 1 to 4 carbon atoms (molecular weight: $5 \times 10^4$ to $6.0 \times 10^5$, preferably $1.0 \times 10^5$ to $2.5 \times 10^5$) and further enables the use in a water-soluble state (different from the state of the so-called solid particles like an ion exchange resin). Of the water-soluble S-containing groups, the most favorable one is a dithiocarbaminic acid group. Also, the present chelating agent may be a polymer containing one hydrophilic S-containing group per 1 to 4 carbon atoms so far as the polymer has water-soluble fragments (e.g., fragments in which a nitrogen, oxygen or sulfur atom is introduced, such as —C—C—O—C—C—, —C—C—S—C—C—, —C—C—N—C—C—, etc.) introduced in the chain of its linear structure.

The present chelating agent can approach silver ion owing to the water-soluble property thereof (preferably its liquid character) even if silver halide and silver ion are in a complex state of existence, thereby enabling selective absorption of silver ion thereonto. Thus, the hydrophilic chelating agent precipitates and separates out. As a result, the removal of silver can be achieved with an easy means. Specifically, the separation can be effected with ease by a low-priced single membrane MF filter.

Moreover, although the above-described chelating agent has hitherto been unknown to be effective in precipitating and separating out silver halide grains as well, it has now been found by our studies that even silver halide grains are precipitated and separated out by the aforementioned chelating agent. This effect is supposed to be a special phenomenon of a water-soluble, linear, S-containing, hydrophilic polymer chelating agent.

The polymer-metal complex formed between a metal (especially silver) and the S-containing hydrophilic polymer chelating agent is insoluble in water. When the valency of the metal to be chelated is more than 1, the polymer-metal complex is mainly a chelate polymer formed by intramolecular or intermolecular chelation of the metal. On the other hand, the metal-polymer complex may be a metal-added polymer formed by mere coordination of the metal to the polymer without forming a chelating ring.

Independently of the above-described matter, there have so far been known solid chelating resins which contain S and N as chelating atoms to capture metals (For details of these resins a book entitled "Chelate Jushi-Ion Kokan Jushi" (which means "Chelate Resins and Ion Exchange Resins"), pages 8–20, compiled by Nobumasa Hohjoh, published by Kohdansha Scientific (1976), and the references cited therein can be referred to). These resins are quite distinct in nature from the foregoing S-containing hydrophilic polymer chelating agent used in the present invention. Specifically, the present S-containing hydrophilic polymer chelating agent is characterized by its solubility in a waste solution.

The present invention prefers hydrophilic polymer chelates containing S as coordination atom. Particularly preferable polymer chelates are those containing as a coordination group a dithiocarbaminic acid group and a derivative thereof (—NH—CS$_2$M), a thiocarboxy group, a dithiocarboxy group, a thiol group or the like. The term "coordination group" as used herein signifies the substituent having an ability to coordinate to silver.

Therein, it is desirable that the coordination group be a water-soluble group, and so M in the above-formula is preferably an alkali metal such as Na, an alkaline earth metal such as Ca, a metallic cation such as Al, or an onium ion, if desired, in addition to hydrogen.

As for the number of coordination groups in a molecule, at least 1 mole, preferably from 20 to 10,000 moles, is advantageous. As for the number of coordination groups per gram of polymer ligands, the range of 0.1 to 50 meq. (milliequivalents) is desirable, and the range of 0.1 to 10 meq. is more desirable.

The solubility in water can be heightened by containing water-soluble coordination groups as described above and, what is more, the reaction with metallic elements in the solution to be treated can be promoted. Thus, the efficiency for removal of metallic elements, especially silver, can be heightened. Therefore, it is desirable that such polymer ligands be used in the form of aqueous solution. In respect of easy addition, it is advantageous to adjust the concentration of an S-containing hydrophilic polymer chelating agent to about 2 to 100% as aqueous solution. On the other hand, the concentration of the S-containing polymer chelating agent in the waste solution comes to be adjusted to the level of 0.1 to 1,000 ppm, although it depends on the content of metals in the waste solution.

The number average molecular weight of the S-containing hydrophilic polymer chelating agent ranges from 50,000 to less than 500,000, preferably from 100,000 to 300,000. Further, it is desirable from the standpoint of reducing the metal concentration in the water which has penetrated the filter (the filtrate) that the S-containing hydrophilic polymer chelating agent have a molecular weight distribution such that those having a number average molecular weight of not greater than 10,000 comprise not greater than 5% by weight of the whole.

As examples of a water-soluble, S-containing, hydrophilic, linear polymer chelating agent which can be used in the present invention, mention may be made of the compounds disclosed in JP-A-61-249590 (the term "JP-A" as used herein means an "unexamined published Japanese patent application"), JP-A-60-106585, JP-A-62-007492, JP-A-62065788, JP-A-64-003549, JP-A-56-039358, JP-A-54-154522, JP-A-54-157824, JP-A-03-231921, JP-A-06-15280, JP-A-05-129133, U.S. Pat. Nos. 4,864,075, 3,882,092, 3,494,945, 5,019,274, 5,089,227, 5,089,619, 3,494,945, 4,112,191, 4,826,625, 4,689,177, 4,659,801 and 1,376,288, European Patent 0202388, SU Patent 230417, and so on. Of these compounds, compounds having higher solubility in water are preferable, and particularly favored ones are those of the general formulae I and II respectively, which are illustrated hereinafter.

As for the solubility in water, it is desirable that at least 1 g, preferably 40 to 900 g, of the S-containing hydrophilic polymer chelating agent used in the present invention be dissolved in 100 g of water.

Specific examples of an S-containing hydrophilic polymer chelating agent which can be used to advantage are illustrated below. However, the invention should not be construed as being limited to these examples.

The compounds of general formula I are linear polymers in which monomer units of the starting linear polymers are substituted with X or/and $X_1$, and have a substitution rate of 5 to 90%.

Specifically, the general formulae I and II which represent the water-soluble, S-containing, linear polymer liquid chelating agents are as follows:

$$\left( \begin{array}{cc} H & X \\ | & | \\ C-C \\ | & | \\ H & H \end{array} \right)_n \quad \left( \begin{array}{ccc} H & X & X_1 \\ | & | & | \\ C-C-C \\ | & | & | \\ H & H & H \end{array} \right)_m \quad \text{I}$$

In the above formula, one of the substituents X and $X_1$ is SM, —NHCOSM, —$NHCS_2M$ or —$CH_2NHCS_2M$, and the other is H; M is Li, Na, K or H; $0 \leq n \leq 30{,}000$; $0 \leq m \leq 30{,}000$; $n+m>100$, preferably $300 \leq n+m \leq 10{,}000$.

$$\left( \begin{array}{ccc} H & H & \\ | & | & \\ C-C-N \\ | & | & | \\ H & H & Y \end{array} \right)_n \quad \left( \begin{array}{cccc} H & H & H & \\ | & | & | & \\ C-C-C-N \\ | & | & | & | \\ H & H & H & Y \end{array} \right)_m \quad \text{II}$$

In the above formula, Y is —COSM or —$CS_2M$; M is Li, Na, K or H; $0 \leq n \leq 30{,}000$; $0 \leq m \leq 30{,}000$; $n+m>100$, preferably $300 \leq n+m \leq 10{,}000$.

Further, the monomer units in the formula I and those in the formula II may form a copolymer, wherein, for examples, the requirement for n becomes the requirement for the sum of $n_I$ and $n_{II}$.

More specifically, the linear compounds relating to the above are cited below:

Examples of Specific Linear Structures $$\sim CH_2-CH-CH_2-CH-CH_2 \sim \quad (1)$$
$$\quad\quad\quad\quad | \quad\quad\quad\quad\quad |$$
$$\quad\quad\quad\quad SM \quad\quad\quad\quad SM$$

$$\sim CH_2-CH(NHCS_2M)\!\!+\!\!CH_2-CH(NHCS_2M)\!\!+\!\!CH_2 \sim \quad (2)$$

$$\sim CH_2\text{-}CH_2\text{-}CH(NHCS_2M)\!\!+\!\!CH_2\text{-}CH_2\text{-}CH(NHCS_2M)\!\!+\!\!CH_2 \sim \quad (2')$$

$$\sim CH_2-CH(NHCS_2M)\!\!+\!\!CH_2-CH(SM)\!\!+\!\!CH_2 \sim \quad (3)$$

$$\sim CH_2-CH_2-N-CH_2-CH_2-N \sim \quad (4)$$
$$\quad\quad\quad\quad | \quad\quad\quad\quad\quad |$$
$$\quad\quad\quad\quad CS_2M \quad\quad\quad\quad CS_2M$$

$$\sim CH_2-CH_2-N-CH_2-CH \sim \quad (5)$$
$$\quad\quad\quad\quad | \quad\quad\quad\quad |$$
$$\quad\quad\quad\quad CS_2M \quad\quad\quad SM$$

$$\sim CH_2-CH_2-CH_2-N-CH_2-CH_2-CH_2-N \sim \quad (6)$$
$$\quad\quad\quad\quad\quad\quad\quad\quad | \quad\quad\quad\quad\quad\quad\quad |$$
$$\quad\quad\quad\quad\quad\quad\quad\quad CS_2M \quad\quad\quad\quad\quad\quad CS_2M$$

$$\sim CH_2-CH_2-CH_2-N-CH_2-CH \sim \quad (7)$$
$$\quad\quad\quad\quad\quad\quad\quad\quad | \quad\quad\quad\quad |$$
$$\quad\quad\quad\quad\quad\quad\quad\quad CS_2M \quad\quad SM$$

$$\sim \overset{O}{\underset{\|}{C}}-O-CH_2CH(NHCS_2M)CH_2 \sim \quad (8)$$

$$\sim \overset{O}{\underset{\|}{C}}-O-CH_2CH(NHCS_2M)CH_2\text{-}S-CH_2\text{-}CH(SM)-O-\overset{O}{\underset{\|}{C}} \sim \quad (9)$$

$$\sim CH_2-CH_2-N-CH_2-CH_2-NH-CH_2-CH_2-N-CH_2 \sim \quad (10)$$
$$\quad\quad\quad\quad | \quad\quad\quad\quad\quad\quad\quad\quad\quad\quad\quad\quad\quad\quad\quad |$$
$$\quad\quad\quad\quad CS_2M \quad\quad\quad\quad\quad\quad\quad\quad\quad\quad\quad\quad\quad CS_2M$$

Examples of More Complicated Compounds Relating to the Above $$\text{(11)} \quad -(CH-CH_2)_n- \text{ with phenyl-SH substituent}$$

$$\text{(12)} \quad -(CH-CH_2)_n- \text{ with phenyl-N-tetrazole-SH substituent}$$

$$\text{(13)} \quad -(CH-CH_2)_n- \text{ with S-triazine-(NaS)(SNa) substituent}$$

$$\text{(14)} \quad \sim CH_2-CH-\!\!-CH_2-\!\!-CH \sim \text{ with two phenyl-}CH_2SM \text{ groups}$$

$$\text{(15)} \quad \left\{ -\overset{O}{\underset{\|}{C}}-O-CH_2CHCH_2-N-CH_2-CHCH_2-O\overset{O}{\underset{\|}{C}}- \right\}$$
$$\quad\quad\quad\quad\quad\quad\quad\quad | \quad\quad\quad | \quad\quad\quad\quad |$$
$$\quad\quad\quad\quad\quad\quad\quad\quad SM \quad\quad R \quad\quad\quad SM$$

$$\text{(16)} \quad \left\{ -\overset{O}{\underset{\|}{C}}-OCH_2CH-S-CH_2CHO-CH- \right\}$$
$$\quad\quad\quad\quad\quad\quad\quad\quad\quad | \quad\quad\quad\quad\quad\quad\quad\quad |$$
$$\quad\quad\quad\quad\quad\quad\quad\quad\quad CH_2 \quad\quad\quad\quad\quad\quad SM$$
$$\quad\quad\quad\quad\quad\quad\quad\quad\quad |$$
$$\quad\quad\quad\quad\quad\quad\quad\quad\quad OH$$

$$\text{(17)} \quad \left( N=C\text{-phenyl-}C=N\text{-biphenyl} \right)_k \text{ with SM groups}$$

$$\text{(18)} \quad -(NH-(CH_2CH_2N)_n-CH_2CH_2NHCONH(CH_3)C_6H_3NHCO)_m-$$
$$\quad\quad\quad\quad\quad\quad\quad\quad | $$
$$\quad\quad\quad\quad\quad\quad\quad\quad C=S(SM)$$

In addition to the above-cited ones, Epoflock L-1 and L-2, trade names, products of Miyoshi Oil & Fat Co., Ltd., Santhiol NW, trade name, a product of Nakagawa Kagaku Sohchi Co., Ltd., Gospel M-9 and M-10, trade names, products of Gospel Kako Co., Ltd. and so on are suitable examples of a water-soluble S-containing hydrophilic polymer chelating agent.

In case the S-containing hydrophilic polymer chelating agent is used alone, it is desirable to add it in an amount of from 0.5 to 4 equivalents, preferably from 0.5 to 2.7 equivalents and more preferably from 0.7 to 2.3 equivalents, per equivalent of metals (especially silver) in the waste solution. When the amount of the chelating agent added is smaller than 0.5 equivalent, a significant amount of metal ions (especially silver ion) fail to coordinate to the S-containing hydrophilic polymer chelating agent, and so the metals (especially silver) remaining in the filtrate increase in quantity. When the amount of the chelating agent added is greater than 4 equivalents, on the other hand, metals (especially silver) coordinating to each molecule of the S-containing hydrophilic polymer chelating agent are reduced in number. As a result of it, the metals and the chelating agent fail to precipitate as the polymer-metal complex, and so the polymer-metal complex is passed through a filter to result in insufficient removal of silver.

Calling special attention to silver laid under the most severe regulation among the metals contained in the waste solution, it is desired that the silver concentration in the waste solution be measured with a silver-detecting means and the amount of the S-containing hydrophilic polymer chelating agent to be added be determined depending on the silver concentration detected. As for the silver-detecting means, it is preferable to use the turbidity measured by the turbidimeter as a standard because silver halide grains as the majority of silver in the waste cause a light scattering phenomenon. By adopting the turbidity as a standard, satisfactory removal treatment of silver can always be achieved, irrespective of fluctuation in silver concentration in the waste solution, thereby enabling the continuous treatment also.

In addition to the aforementioned single membrane MF filters, any of low-priced filter membranes which can be produced with ease and have a pore size of 0.01 to 10 µm, preferably 0.03 to 3 µm, and more preferably 0.05 to 1 µm, can be used for filtering out the polymer-metal complex in the present invention, provided that it does not have such a multiple layer structure as UF and RO membranes have.

Such filters may be made from any material, and so even cheap materials, such as polyvinyl chloride, polyethylene, polypropylene, polybutylene and the like, can sufficiently serve the purpose. However, expensive polymers such as polysulfone, polyacrylonitrile and the like can be used, if needed.

Specific examples of such a single membrane filter include a porous polymer single membrane filter, a ceramic single membrane filter, and optionally a pulp fiber filter.

As for the polymer used for the porous polymer single membrane filter, polyvinyl chloride, polyethylene, polypropylene, polybutylene, polysulfone and acrylonitrile are examples thereof.

As for the ceramic in the ceramic single membrane filter, porous glass, a clay plate, an igneous rock plate and a foaming nitride are examples thereof.

As for the pulp in the pulp fiber filter, general filter papers such as No. 5 A filter and No. 5 C filter are examples thereof.

Of the above-cited filters, porous polymer single membrane filters are preferred over the others because of their light weights and easy shaping. Specific examples of commercially produced filters of the above-described types include various kinds of Yumicron membranes produced by Yuasa Co., Ltd., Milipore filters (e.g., Milipore AA, DA, HA, PH, GS, FG, UC, UM, US, GU, HP, etc.) produced by Milipore Co., Ltd., Fine filters produced by Kuraray Co., Ltd. (SF-301, SF-101, SF-401), Goatex Membrane produced by Goatex Co., Ltd., and hollow-fiber single membrane MF filters (e.g., Kuraray SF filter (material: polyvinyl alcohol, pore diameter: 0.1 µm), produced by Kuraray Co., Ltd., SR-205 (material: polyolefin, pore diameter: 0.1 µm), produced by Asahi Chemical Industry Co., Ltd., and E202AE (material: fluororesin, a pore diameter: 0.2 µm), produced by Nitto Electric Industry Co., Ltd., and Sterapore STNM424 (material: polyethylene, pore diameter: 0.1 µm), produced by Mitsubishi Rayon Company Limited).

As for the fiber filter, filters made of 0.01 denier fibers (of nylon, polypropylene and polyethylene) can be used.

Of these filters, the Yumicron system produced by Yuasa Co., Ltd. is used to advantage because it enable filtration under a low applied pressure. When it is intended to form precipitates from an S-containing hydrophilic polymer chelating agent and metals (especially silver) and separate out them with the Yumicron system, the S-containing hydrophilic polymer chelating agent becomes insoluble in water by trapping metals so far as it has an average molecular weight ranging from $5\times10^4$ to $6.0\times10^5$, preferably from $1.0\times10^5$ to $2.5\times10^5$, and fails to effuse into the solution which has penetrated the Yumicron membrane, although the membrane used in the Yumicron system has a pore size of 0.45 µm.

It is difficult to make a single membrane filter having a pore size of below 0.01 µm. In general, no filter can have such a small pore size unless it is made in the form of multi-layer membrane. Therefore, the cost of such a membrane becomes high. Further, such a membrane tends to stop, and so it takes a long time to complete the filtration. On the other hand, filters having a pore size greater than 10 µm permits relatively fine precipitates of a polymer-metal complex to pass therethrough. Herein, therefore, sufficient removal of metals cannot be hoped for.

As for the way of filtering which can be used in the present invention, any methods can be adopted so far as polymer-metal complexes can be thoroughly caught and collected by a filter in a comparatively short time. As for the pressure under which the filtration is carried out, it is desirable to filtrate in a closed state under a uniform pressure of not higher than 1 Kg/cm$^2$, preferably from 0.05 to 0.9 Kg/cm$^2$, and more preferably from 0.1 to 0.8 Kg/cm$^2$. The term "uniform pressure" as used herein means that the pressure is not applied perpendicularly to the filtering plane but parallel with the filtering plane, thereby making it possible to perform the filtration without applying a great pressure to the filter. This way of filtering is called the cross-flow filtration. By adopting the cross-flow filtration, the stopping of a filter can be reduced, the filtration capacity is heightened, and consistent filtration in the continuous treatment becomes possible. The flow rate of a waste solution, though it depends on the filtering apparatus used, ranges from 30 to 1,000 ml/m$^2$.min, and the treatment of 1 to 30 BV/hour is required.

In the filtration method with the above-described filter, a one-passage system, or passing once the solution through the filter, can sufficiently serve the purpose. In some cases, however, a multistage one-passage system or a mono- to multi-stage circulation system may be adopted.

The shape and the size of the filter used in the present invention are chosen depending on its aim, its use and so on. Preferably, a bag-form filter having a great filtering area and a hollow fiber filter are used. More preferably, the solution to be treated is made to flow into a bag-form filter from the exterior thereof and the filtrate is made to flow out of the interior thereof. Therein, it is desirable that a pressure of 0.1 to 0.8 Kg/cm$^2$ be applied to the filter from the outside or the inside pressure of the filter be reduced (−0.1 to −0.8 Kg/cm$^2$). In addition, the unfixed part of a bag-form filter is larger than the fixed part thereof, and so the filter is of advantage in that it enables the treatment carried out as the filter is vibrated during filtration.

In order to provide the precipitate layer with the filtering function for the Ag-polymer particles, the layer must have certain thickness. While the thickness is small, the effect of stopping Ag-polymer particles is poor. Suitable water-soluble, linear polymer chelating agent has a molecular weight of $1.0 \times 10^5$ to $5.0 \times 10^5$. When the treatment is performed so that the precipitates of polymer-metal complexes may adhere to the filter in an amount of 5 to 40 ml per m$^2$ of filter surface, the present invention can achieve its effect.

Since the precipitates adhere to the filter by the filtration treatment described above, it is necessary to recover these precipitates. However, such precipitates are a high value-added matter because they contain silver. Additionally, they are in a sludgy state, and so it is desirable for them to be taken by persons concerned in recovery business.

The solution containing silver halide emulsion is a solution containing silver halide and silver ion since a silver halide emulsion contains not only silver halide grains but also silver halide in a dissolved condition since it contains an excess of halogen over silver and part of silver halide grains are dissolved by the dissolution action of halogen on silver halide. That is, a finished emulsion generally contains excess halogen, and so the pAg thereof is greater than 8. Accordingly, solid silver halide is dissolved in a proportion balanced with the difference in pAg from 8 to result in presence of both silver halide and silver ion (dissolved).

More specifically, silver halide and silver ion in a proportion on a level of $10^{-2}$ to $10^{-6}$ mole to the silver halide are dissolved in a silver halide emulsion. This concentration is changed depending on the quantity and the type of a surrounding solvent (halogen in this case). Further, it depends on the kind of the silver halide emulsion. In disposing of an emulsion as waste, it sometimes happens that the emulsion is diluted with water and the water used contains other solvents as impurities, and so it can be supposed that the emulsion exists in a complex form. Also, it sometimes contains other metals. Further, there is some possibility of the waste solution containing part of processing solutions, and in such a case it becomes necessary to take into account $S_2O_3^{2-}$, $SO_3^{2-}$ and the like as AgX solvents. Thus, it can be said that silver in the waste solution is present on a concentration level of 1 to 120 ppm in such a complex state as described above.

When the foregoing waste solution is treated in accordance with embodiments of the present invention, the silver concentration in the filtrate is reduced to not higher than 10 ppm, usually the range of 0.001 to 1 ppm. Further, it is possible to reduce the silver concentration to the range of 0.001 to 0.1 ppm. The reduction of the silver concentration in the filtrate to less than 1 ppm makes it possible to successfully cope with the silver discharge regulation values enacted in about 80% of the regions of U.S.A. and Europe, the reduction thereof to less than 0.1 ppm makes it possible to successfully cope with the silver discharge regulation values enacted in about 99.9% of those regions, and the reduction thereof to less than 0.01 ppm makes it possible to clear up the silver discharge regulation in 100% of those regions. Specifically, in the certain regions of U.S.A. which have severe silver-discharge regulation (e.g., Houston Tex. and Kileen Tex., wherein Ag<0.05 ppm; Addison IL, wherein Ag<0.03 ppm; North Carolina Ancharge AK, wherein Ag<0.02 ppm) and certain countries in Europe which also have severe silver-discharge regulation (e.g., Swiss, Ag<0.01 ppm; Niers River, Germany, Ag<0.008 ppm), the filtrate obtained using the above-described means without making any modification or by connecting the means in series can be discharged into drainage and rivers as it is. As a result thereof, the cost for recovery can be reduced.

As for the metals, other than silver, capable of being removed by the present methods, cerium, aluminum and iron in the waste solution are examples thereof. In the treatment for removal of these metals, namely cerium, aluminum and iron, an S-containing hydrophilic polymer chelating agent as polymeric complexing agent is added to the waste solution in such an amount that the mole ratio of the adsorption-functional group in the chelating agent to the cerium, aluminum or iron in the waste solution may range from 0.5 to 4. In the case where two or more of metals, including silver and the other metals, are present together, the mole ratio of the adsorption-functional group in the chelating agent to the whole metals is set within the range of 0.5 to 20 in order to completely remove silver whose discharge standard is severe and further remove the other metals. However, if attention is given to silver alone, the mole ratio ranging from 0.5 to 4 suffices for the removal thereof. This is because silver is most liable to undergo adsorption among metals.

The methods of the present invention can be applied to the case where the waste solution discharged from a photosensitive material-manufacturing plant is contaminated with the waste generated by-wash after fixation. When the present methods are used for treating only the waste solution generated by wash after fixation, on the other hand, the water which has been passed through the present filter may be re-used for dissolution of, e.g., a fixing agent. This is because when the precipitates containing both the S-containing hydrophilic polymer chelating agent and silver are produced and separated out with the present filter, dyes and surfactants contained in the fixer and in the wash water after fixation are also removed at the same time, and part of ingredients in the fixer can remain in the filtrate.

The present invention will be explained in more detail with reference to the following examples.

EXAMPLE 1

Silver-containing waste solutions discharged from the factories for manufacturing color papers, color negative films, reversal color papers and color reversal films were kept in a reservoir of 5,000 tons. A 500 ml portion of the kept waste solution was taken out, and subjected to silver analysis using atomic absorptiometry. Thus, the silver concentration in the waste solution was determined to be 153 ppm. This emulsion-containing waste solution (Ag concentration=153 ppm) underwent the following treatments:

(1) Each of the conventional chelating resins set forth below was added in amount of 5 g to 100 ml of the waste solution, stirred for 30 minutes, and then allowed to stand for 30 minutes and one day (i.e., 24 hours);
   a: Dithiocarbaminic acid resin, Sumitomo Kagaku Q-10R,
   b: Dithiocarbaminic acid resin, Miyoshi Oil & Fat Z-7,
   c: Polyamine resin, Uniti UR-3900,
   d: Polyamine resin, Mitsubishi Diaion CR-20,
   e: Glucan resin, Amberlite IRA 743,
   f: Glucan resin, Mitsubishi Diaion CRB-02, (2) Each of the present S-containing hydrophilic polymer chelating agents set forth below was added as described below to 100 ml of the waste solution, stirred for 1 minute, and then allowed to stand for 30 minutes;
   p: EPL-1, produced by Miyoshi Oil & Fat Co., Ltd., 0.03 ml q: EPL-2, produced by Miyoshi Oil & Fat Co., Ltd. 0.07 ml
r: Compound (1), 0.03 ml
s: Compound (2), 0.05 ml
t: Compound (3), 0.04 ml
u: Compound (4), 0.04 ml
v: Compound (5), 0.04 ml After the above-described treatment, each supernatant was analyzed with respect to silver. The silver concentrations determined are shown below:

| Agent | a | b | c | d | e | f | p | q | r | s | t | u | v | |
|---|---|---|---|---|---|---|---|---|---|---|---|---|---|---|
| Ag | | | | | | | | | | | | | | |
| (ppm) | 13 | 37 | 11 | 24 | 33 | 27 | 0.12 | 0.05 | 0.08 | 0.10 | 0.09 | 0.11 | 0.07 | one day |
| (ppm) | 111 | 138 | 98 | 121 | 130 | 125 | 6.9 | 4.2 | 4.9 | 5.3 | 5.1 | 5.4 | 4.2 | 30 min. |

The above data prove that the hydrophilic polymer chelating agents are surprisingly specific for silver halide and have a great ability to separate silver. In other words, it has been found that although the solid chelating agents having the same functional groups had a small ability in removal of silver, the hydrophilic chelating agents, especially hydrophilic S-containing linear polymer chelating agents, were remarkably high in ability to remove silver. In the case of carrying out examination after mere 30 minutes' standing, on the other hand, the chelating resins a to f showed a markedly low ability in removal of silver. Accordingly, it is presumed that the present S-containing hydrophilic polymer chelating agents can easily approach silver by molecular motion because they are in a liquid state, and so they can rapidly reaction with silver to produce insoluble silver complexes. Thus, such polymer chelating agents can have an ability to precipitate and separate out silver.

EXAMPLE 2

Example 2 was carried out according to the treatment process shown in FIG. 1(a).

Specifically, silver-containing waste solutions discharged from the factories for manufacturing color papers, color negative films, reversal color papers and color reversal films were kept in a reservoir (a) of 5,000 tons. A 500 ml portion of the kept waste solution was taken out, and subjected to silver analysis using atomic absorptiometry. Thus, the silver concentration in the waste solution was determined to be 153 ppm. This silver-containing waste solution was treated using each of the following processes from (1) to (5) with treating time of 40 minutes: (1) The silver-containing waste solution was admitted to the reservoir (a), and thereto was added 3 ml of a metal precipitant, TK Flock (trade name, a 9% $Al_2O_3$ solution as precipitant for water treatment, produced by Taki Kagaku Co., Ltd.). Further, the solution was adjusted to pH<4 by addition of hydrochloric acid. Subsequently thereto, the solution treated in the reservoir (a) was admitted to a reservoir (b), and thereto was added sodium hydroxide so that the solution might be neutralized (pH= 6.5). Then, the neutralized solution was admitted to a reservoir (c), and thereto was added 2 ml of an organic polymer precipitant, Sanpoly 505 (trade name, produced by Sankyo Chemical Industry Ltd., viscosity: 49 cp as a 0.5% water solution of white granular powder, pH=6 to 8).

(2) The treatment was carried out in the same manner as the foregoing process (1), except that before admitting the silver-containing solution to the reservoir (a) there was added 0.4 ml of an S-containing hydrophilic polymer chelating agent, Epoflock L-2, produced by Miyoshi Oil & Fat Co., Ltd.

(3) The treatment was carried out in the same manner as the foregoing process (1), except that after adding the TK Flock to the reservoir (a) there was added 0.4 ml of EPL-2.

(4) The treatment was carried out in the same manner as the foregoing process (1), except that after conclusion of the treatment in the reservoir (c) there was added 0.4 ml of EPL-2.

(5) The treatment was carried out in the same manner as the foregoing process (1), except that the treatments in the reservoirs (a) and (b) were omitted, the silver-containing waste solution was admitted to the reservoir (c), and thereto were added 0.2 ml of Epoflock L-2, produced by Miyoshi Oil & Fat Co., Ltd., and 2 ml of a 0.5% solution of Sanpoly 505.

The thus treated waste solutions were subjected to Ag analysis, and gave the results shown below.

| Treatment Process No. | (1) | (2) | (3) | (4) | (5) |
|---|---|---|---|---|---|
| Ag Concentration (ppm) | 5.4 | 0.09 | 0.09 | 0.07 | 1.50 |

In case where it becomes necessary to reduce the silver concentration in a waste solution from a factory to not higher than 0.02 ppm through a tightened-up environments regulation, the Ag concentration in the waste solution after a silver removal treatment must be at most 0.1 ppm even if the silver-containing waste solution will be mixed with a five-fold quantity of general waste solution (silver-free waste solution). Making an allowance for a variety of circumstances, it is required of the Ag concentration to touch a level of not higher than 0.05 ppm.

Thus, the experimental results set forth above demonstrate that the processes (2), (3) and (4) alone are successful in removing silver on the level securing the present object.

While reduction of Ag concentration of initial 153 ppm to final 0.05 ppm is possible according to the present process (2), (3) or (4), even more effective silver elimination is achieved by extending the precipitation time. For instance, the combination of 2 minutes' stirring after the addition of the present chelating agent and 30 minutes' standing enabled the achievement of the level of less than 0.01 ppm. In other words, the present processes realized a marvelous silver-removal rate, specifically $0.05/153=3.2\times10^{-4}$ in the case of 0.05 ppm and $0.01/153=6.5\times10^{-5}$ in the case of 0.01 ppm. This is because the silver-removal rate obtained by conventional methods is on the level of 0.035. Accordingly, the present level corresponds to the one tenth to one hundredth of the conventional level.

Since it is naturally supposed that a long process and vast energy and labor would be required for achievement of the silver-removal rate on the level of $10^{-4}$ to $10^{-5}$, it is a great surprise that the aim was achieved with ease by the present processes.

EXAMPLE 3

The treatments (1) to (6) carried out herein are illustrated below using FIG. 1(a).

(1) Instead of carrying out the addition of TK Flock and hydrochloric acid to the reservoir (a), the pH adjustment in the reservoir (b) and the addition of Sanpoly to the reservoir (c) in the treatment process (1) of Example 2, 2 ml of a strong anion polymer, Sanpoly A-530, trade name, produced by Sankyo Chemical Industry Ltd. was added to the reservoir (a) and stirred, and thereto was further 2 ml of a strong cation polymer, Sanpoly K-302, trade name, produced by Sankyo Chemical Industry Ltd., followed by stirring. The thus obtained supernatant was subjected to Ag analysis.

The treatments (2) to (6) were carried out in the same manner as the above-described treatment (1), except that they were different in the following points respectively:

(2) EPL-2 was added at the same time as the addition of Sanpoly A-530.

(3) EPL-2 was added after the addition of Sanpoly A-530.

(4) EPL-2 was added after the addition of Sanpoly K-302.

(5) EPL-2 was added instead of adding Sanpoly K-302.

(6) EPL-2 alone was added without adding Sanpoly A-530 and Sanpoly K-302.

In the treatments (2) to (6), the amount of EPL-2 added is 0.4 ml per 500 ml of silver-containing waste solution.

The results obtained are shown below:

| Treatment No. | (1) | (2) | (3) | (4) | (5) | (6) |
|---|---|---|---|---|---|---|
| Ag Concentration (ppm) | 7.3 | 0.04 | 0.03 | 0.02 | 0.12 | 1.43 |

The removal of silver by the treatments (1) and (6) each was insufficient, but the removal of silver by each of the treatments from (2) to (5) was on a rather satisfactory level. In particular, the treatments from (2) to (4) were successful in removing silver.

EXAMPLE 4

Figure 2:
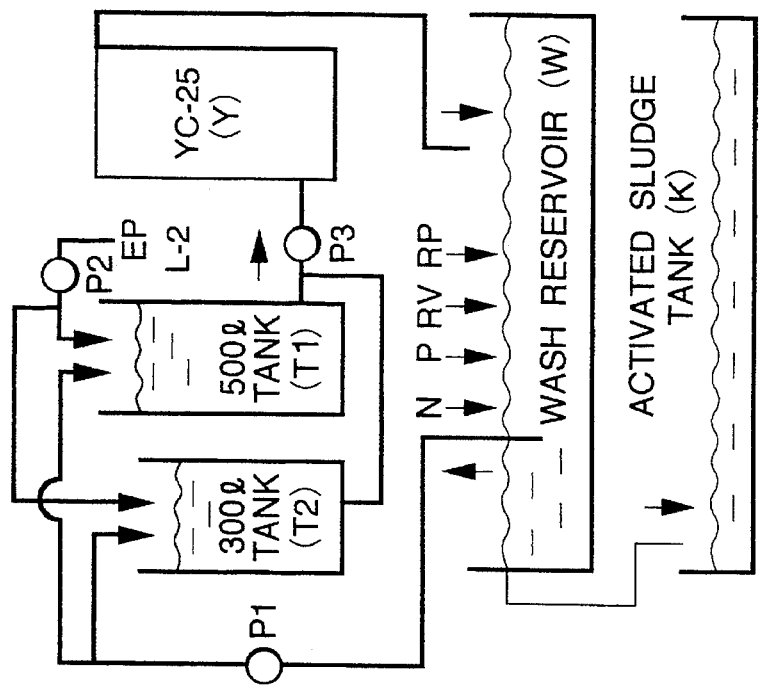
FIG. 2 shows an embodiment of another method adopted in Examples of the present invention and preferred as the silver-removing method of the present invention.

The treatment herein was carried out using the treatment system shown in FIG. 2.

Waste solutions from the processing of photosensitive materials and from factories for producing photosensitive materials were stored up in the wash reservoir W, and the Ag concentration therein was 25 ppm. For the purpose of saving a treatment time, the tank T1 and the tank T2 were alternatively used. The steps from (1) to (5) described below were performed one after another.

(1) By switching the pump P1 on, 500 liter of the waste solution was transferred from the wash reservoir W to the tank T1 (having a tank volume of 1 ton, containing 300 liter of residues (precipitates) at the bottom thereof, whereby the volume of the contents therein became 800 liter, but from which 500 liter of the contents was transferred to the YC-25 upon filtration) and, at the same time, 300 liter of the waste solution was transferred from the wash reservoir W to the tank T2 (having a tank volume of 600 liter, containing 200 liter of residues (precipitates) at the bottom thereof, whereby the volume of the contents therein became 500 liter, but from which 300 liter of the contents was transferred to the YC-25 upon filtration).

(2) A 10% emulsion solution was added to the tank T1 (waste water volume: 500 liter) in an amount of 1 liter and to the tank T2 (waste water volume: 300 liter) in an amount of 0.6 liter, followed by one minute's stirring.

(3) By switching the pump P2 on, EPL-2 was added to the tank T1 in an amount of 130 ml/500 l waste water and to the tank T2 in an amount of 80 ml/300 l waste water. The ratio between the amounts added herein was chosen so as to correspond to the ratio between the amounts of the pseudo emulsion-contaminated waste solutions in those tanks. Thereafter, each of the resulting waste solutions was stirred for 2 minutes, and allowed to stand for 30 minutes.

(4) By switching the pump P3 on, the solutions in the tanks were transferred into YC-25 (Y) at a total flow rate of 5 liter/min.

(5) The water which had penetrated the YC-25 (Y) was automatically discharged at a rate of 5 liter/min., and returned to the wash reservoir W.

The 10% emulsion solution used in the above procedure (2) was prepared by warming an emulsion up to 40° C., taking out a 1 liter portion thereof, and diluting it to 10 liter with water. The resulting solution was screened from light by storing it in a cold and dark room, because it liberates silver by exposure to light.

When EPL-2 (Epoflock L-2) was added to the tanks T1 and T2, as shown in FIG. 2, and the filtration was carried out using the low-pressure bag-form filtration system represented by Y in FIG. 2 (Yumicron filtration system YC-25, produced by Yuasa Corporation), the removal of silver was effected securely.

The silver-removal rate obtained as a result of this treatment was on a surprising level, namely $(0.01 \text{ to } 0.005)25=(2 \text{ to } 4)\times10^{-4}$.

EXAMPLE 5

The treatment according to the same steps as in Example 4 was continued for one week as the Ag concentration in the tanks was varied from 2 to 150 ppm by changing the amount of the emulsion solution added. Therein, however, the amount of EPL-2 added was kept constant in analogy with Example 4. As a result of it, it was found that the Ag concentration in the water which had penetrated the filter was always within the range of 0.002 to 0.01 ppm. Accordingly, this treatment system proved to be stable to the variation in Ag concentration. The highest silver-removal rate was $0.01/150=6.7\times10^{-5}$. Further, the foregoing treatment was performed changing also the amount of EPL-2 so that the EPL-2/Ag ratio might be adjusted to 1.2 by mole through the measurement of the Ag concentration in the waste solution by means of a commercially produced turbidimeter (e.g., a portable turbidimeter Model PC-06, produced by Kyoto Denshi; a turbidimeter Model WA-PF4, produced by Kyoritsu). As a result of it, the silver-removal rate of $6.7\times10^{-5}$ was achieved securely.

EXAMPLE 6

Figure 3:
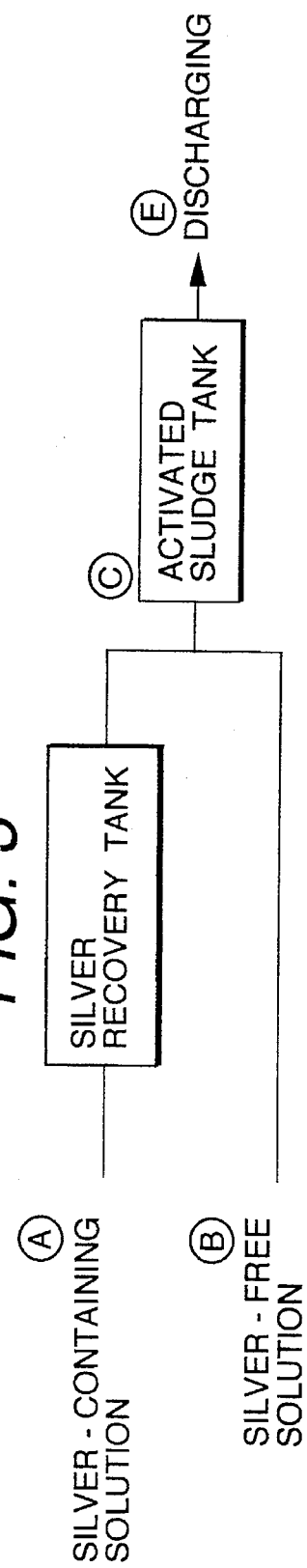
FIG. 3 shows an embodiment of still another method adopted in Examples of the present invention and preferred as the silver-removing method of the present invention.

The concept of the silver-removed waste water disposal in a factory for producing silver halide photographic materials is shown in FIG. 3.

Therein, the solution after an activated sludge treatment was taken out and subjected to the Ag analysis by flameless atomic absorptiometry. The Ag concentrations was 1.34 ppm just after sampling, but as it varied with the lapse of time, it occurred that diverse values of from 0.25 to 0.85 ppm were obtained depending on the time taken for analysis. When this solution was filtered by No. 5c filter (produced by Toyo Roshi Co., Ltd.), the silver-removal rate achieved was nothing but the level of ½ to ⅕. On the other hand, the filtration carried out using a microfilter (having a pore diameter of 0.45 μm) produced by Fuji Photo Film Co., Ltd. achieved the silver-removal rate on the level of 1/100. More specific results are shown below:

| Analysis Method | Ag Concentration in Filtrate of Filter Paper No. 5c | Ag concentration In Filtrate of Microfilter (0.45 μm) |
| --- | --- | --- |
| Flameless Atomic Absorptiometry | 0.16 ppm | 0.007 ppm |
| ICP (Plasma Emission Spectrophotometry) | 0.15 ppm | 0.0007 ppm |

As can be seen from the above data, the filtration with the microfilter having a pore diameter of 0.45 μm enabled reduction of the Ag concentration to about one hundredth its value after the activated sludge treatment. Although the filter paper No. 5c has a nominal pore size equivalent to 0.45 μm, it was not very effective in removing silver. On the other hand, the microfilter removed silver to enable the achievement of the Ag concentration level of 0.007 ppm.

By way of caution, the Ag concentration was re-examined by plasma emission spectrophotometry capable of greater precision. Thus, the Ag concentration was found to be 0.0007 ppm. That is, it may be concluded that substantially all the silver was removed.

EXAMPLE 7

The treatment was performed in the same manner as in Example 6, except that the Yumicron filtration system YC-25 (0.45 μm), produced by Yuasa Corporation, was used in place of the Microfilter. Although the Ag concentration in the waste solution after the activated sludge treatment fluctuated from 0.5 ppm up to 7 ppm, the water which had penetrated the YC-25 had an Ag concentration on the level of 0.001 to 0.01 ppm. That is, the greatest silver-removal rate of $1.4 \times 10^{-4}$ was achieved. Moreover, even when the treatment was continued for 2 days in a throughput of 0.3 ton/hour, the foregoing silver-removal level was secured.

EXAMPLE 8

The treatment was performed in the same manner as in Example 6, except that the Microfilter was replaced by a hollow-fiber filtration system (the hollow-fiber filter (or hollow-fiber membrane) module for PW system: 0.1 μm), which has so far been used for the membrane-separable activated sludge disposal plant of PW-W system, produced by Ebara Infilco Co., Ltd. The Ag concentration in the water which had penetrated the filtration system was on the level of 0.001 to 0.05 ppm. Moreover, even when the treatment was continued for 2 days in a throughput of 0.3 ton/day, the foregoing silver-removal level was secured.

EXAMPLE 9

The treatment was performed in the same manner as in Example 7, except that an ozone treatment for sterilization (using OZN-11-U, produced by Ebara Mfg. Co., Ltd.) was inserted between the activated sludge treatment and the filtration with YC-25.

In Example 7, when the waste solution which had treated in a throughput of 5 liter/min amounted to 25 tones, the flow rate of the filter penetrating water was on the level of 2 liter/min. Therefore, it was necessary to give the filtering plane a cleaning.

In this example, on the other hand, no reduction in the flow rate of the filter penetrating water was observed even after the total throughput came to 100 tons (4 days' continuous treatment), and the silver-removal level was maintained constant.

The Ag concentration in the waste solution was determined after each treatment was completed, and the results obtained are shown below.

| Treatment | After Activated Sludge Treatment | After Ozone Treatment | After Filtration with YC-24 |
| --- | --- | --- | --- |
| Ag Concentration | 1.49 ppm | 1.13 ppm | 0.003 ppm |

The above data proves that the removal of silver was not due to the ozone treatment but due to the filtration with a bag-form single membrane (YC-25).

While the ozone treatment removed only slight silver, the filtration with YC-25 carried out after the ozone treatment removed silver to a remarkable extent.

EXAMPLE 10

Figure 4:
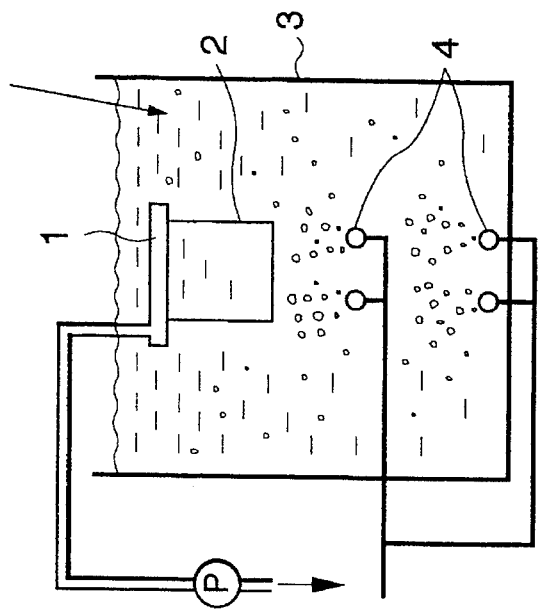
FIG. 4 shows an embodiment of the filtering method adopted in Examples of the present invention and preferably used in the silver-removing method of the present invention. Therein, the numeral 1 denotes a fixed outlet for taking out the water which has penetrated a filter, the numeral 2 a filter, the numeral 3 a reservoir, the numeral 4 air bubblers, and the capital letter P a pump.

The filter module of YC-25 used in Example 7 was taken out and thereto, as shown in FIG. 4, were fitted a fixed outlet 1 for taking out a filtrate so that the outlet might be closely jointed to the filter 2 the filtering plane of which was rendered vibratile. Then, the resulting filter module was placed in the reservoir 3 (the filter had not particular restriction as to the location in the reservoir, but it is preferably located in a upper part of the reservoir), and further the outlet 1 was connected with a pipe equipped with a pump P. Thus, the water which had penetrated the filter was sucked up with the pump.

In addition, the reservoir 3 was provided with air bubblers 4 so that the filtration might be carried out while the filter 2 was being vibrated (the air bubblers had no particular restriction as to the position to be placed, but they are preferably located in a lower part of the reservoir). Thus, the filtration under air-bubbling came to be performed. As for the means to vibrate the filter 2, the invention should not be construed as being limited to an air-bubbling means, but any other means can be used so far as they can vibrate the filter 2.

Owing to vibrating the filter, there was observed no reduction in the flow rate of the water which had penetrated the filter even after the 500 tons' treatment, and so constant removal of silver was effected. That is, it is concluded that the filtration under air-bubbling can prevent the filter from stopping.

Therefore, the present method can reduce not only the cost of equipment because it requires no ozone treatment but also the labor cost because it requires no wash operation of the filtering surface of the filter cartridge. Moreover, the silver-removal rate obtained by the present method was as satisfactory as in Examples 6 to 9. These advantages are thought to result from a fact that the $S_2/S_1$ ratio of the single membrane used (wherein $S_2$ stands for the unfixed surface area of the filter and $S_1$ stands for the fixed surface area of the filter) was very great, namely 2,000, and so most of the filter surface was vibrated by air-bubbling to prevent the adhesion of sludgy precipitates thereto.

EXAMPLE 11

There was carried out the same treatment as in Example 10, except that the hollow fiber filter module of PW-W system, produced by Ebara Infilco Co., Ltd., was used in place of YC-25. Herein, the result similar to that in Example 10 was obtained. It is also concluded that the filter used was effective in preventing the sludgy precipitate from adhering thereto through its vibration since the $S_2/S_1$ ratio of the filter used was 3,600 and, in other words, most part of the filter used was mobile.

Thus, the vibration of filter was proved to be effective by the results obtained in Examples 10 and 11, when the filters had a great $S_2/S_1$ ratio.

EXAMPLE 12

The process (4) in Example 2 was applied to the "recovery of silver" in FIG. 3, and the treatment in Example 10 was applied to the "activated sludge" in FIG. 3. By using the resulting treatment system, the waste solution from the factory for photosensitive materials was treated.

More specifically, the Ag concentration was first considerably lowered in the silver-recovery part. Then, as shown in FIG. 3, a silver-free waste solution (a) and the waste solution after the silver-recovery treatment (b) were mixed together, followed by transfer to the activated sludge part (c). If the quantitative ratio of the silver-free solution (a) to the solution after the silver-recovery treatment (b) is 1:1, one half the Ag concentration in the solution after the silver recovery treatment becomes the initial Ag concentration in the activated sludge part. Also, the treatment in the activated sludge part (c) can remove silver. Accordingly, even if either the performance of the silver-recovery part or that of the activated sludge part according to the embodiment of Example 10 was insufficient, the reduction of the Ag concentration to the level of 0.01 ppm was achieved through the complement of each other.

EXAMPLE 13

Figure 1B:
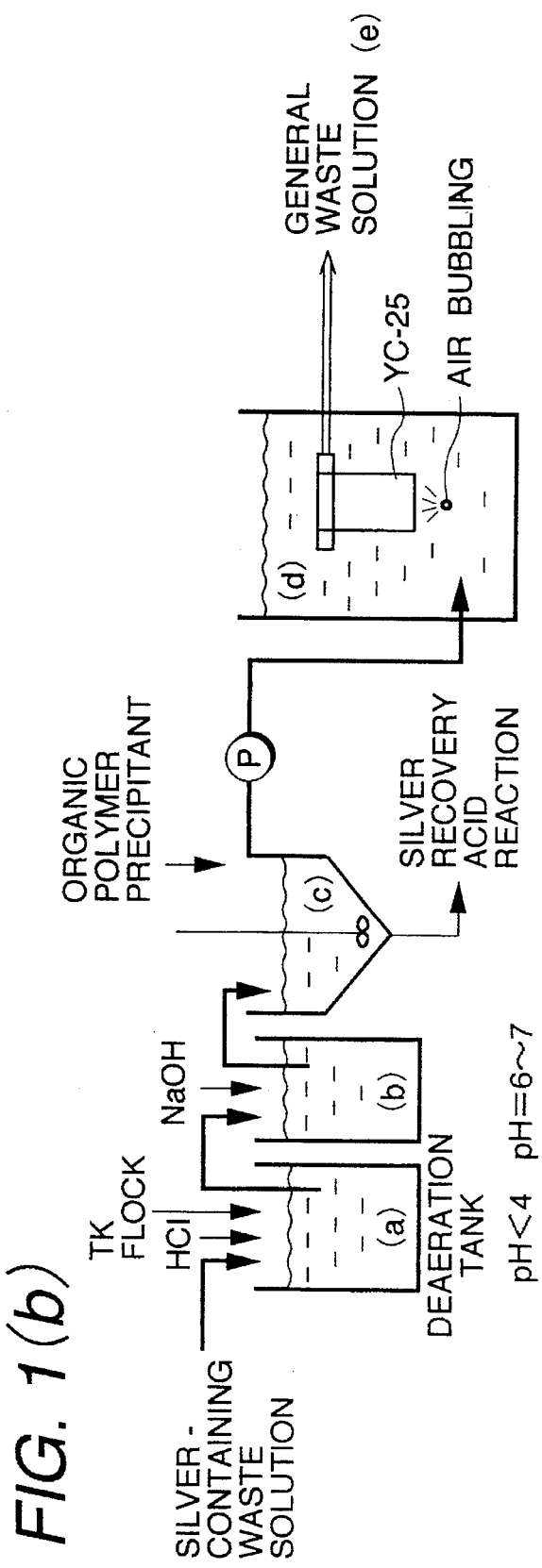

Using the silver-recovery treatment process shown in FIG. 1(b), which is the combination of a conventional silver-recovery treatment process shown in FIG. 1(a) with the suction type YC-25 used in Example 10, the treatment was performed as EPL-2 was fed to the pump P arranged between (c) and (d) in the proportion of 1.2 equivalent to the silver species.

The silver concentration after each step was determined, and the results of silver analysis are shown below.

|  | Original Waste | After Step (a) | After Step (b) | Outlet of (c) | In (d) | In (e) |
| --- | --- | --- | --- | --- | --- | --- |
| Silver Concentration | 185 ppm | 183 ppm | 121 ppm | 13.4 ppm | 0.23 ppm | 0.005 ppm |

Specifically, the silver concentration was reduced to 0.23 ppm in (d) from the original concentration of 185 ppm (silver-removal rate=$1.2\times10^{-3}$). By the addition of YC-25, the silver concentration was reduced to 0.005 ppm from 185 ppm (silver-removal rate=$2.7\times10^{-5}$). In other words, the addition of YC-25 reduced the silver concentration to 1/50.

EXAMPLE 14

The treatment was carried out in the same manner as in Example 13, except that the hollow-fiber module of PW-W system was used in place of YC-25, to give a good result similar to that in Example 13.

EXAMPLE 15

The treatment was carried out in the same manner as in Example 10, except that 10% EPL-2 was added in a proportion of 20 ml per ton of the waste solution. Herein, the waste solution was admixed with an emulsion before it was admitted to the activated sludge tank, thereby adjusting the silver concentration to 4.5 ppm. As a result of the treatment, the silver concentration in the water which had penetrated the filter was securely reduced to the level of 0.002 ppm.

Further, the amount of the emulsion added was changed, and thereby was varied the Ag concentration from 1.5 ppm to 15 ppm. In spite of the variety in original Ag concentration, the Ag concentration in the water which had penetrated the filter was constant at the level of 0.002 ppm.

EXAMPLE 16

The treatment was carried out in the same manner as in Example 15, except that the amount of 10% EPL-2 was reduced to 4 ml/ton and TK Flock was added in an amount of 150 ml/ton instead, thereby achieving the Ag concentration of 0.002 ppm.

Compared with the treatment in Example 15, this treatment resulted in reduction of running cost since the addition of cheap TK Flock (a price of which is, e.g., 300 yen/kg) enabled the saving of expensive EPL-2 (a price of which is, e.g., 2,000 yen/kg).

That is, the combined use of an S-containing water-soluble polymer chelating agent and another precipitant enabled reduction in cost of silver-removal treatment.

EXAMPLE 17

According to the flowchart shown in FIG. 3, a silver-containing waste solution A (300 tons/day) from a factory for photosensitive materials was subjected to a silver-recovery treatment, then mixed with a silver-free waste solution B (600 tons/day), and further fed to the activated sludge tank C, followed by discharging from the tank C as a water flow E (900 tons/day). Such a treatment as described above was compared with the case in which after mixing the waste solution A and the waste solution B the silver-recovery treatment was carried out, followed by treating the resulting solution in the activated sludge tank C.

(1) The average silver concentration in the silver-containing waste solution A (emulsion-containing waste solution) was adjusted to 25±10 ppm. In analogy with Example 3, EPL-2 was added in an amount of 200 ml per ton of the above-described waste solution A, stirred for 2 minutes, settled for 30 minutes, and then treated with a low-pressure bag-form MF filter (YC-25, produced by Yuasa Corporation). Thus, the Ag concentration in the water flow E was from 0.003 ppm to 0.000 ppm.

(2) The mixture of the silver-containing waste solution A and the silver-free waste solution B was treated in the same manner as in Example 3. As the Ag concentration in the mixture was low (8±3 ppm), however, the sedimentation did not occur in 30 minutes, and so it took 3 hours to cause the sedimentation. In order to cause the sedimentation in 30 minutes, it was necessary to further add a good deal of a polymer precipitant, Sanpoly 505 (produced by Sankyo Chemical Industry Co., Ltd.).

That is, the case (2) requires a large volume of sedimentation tank because of long sedimentation time to result in a rise of equipment cost, compared with the case (1). In order to remove the foregoing drawback, on the other hand, it becomes necessary to further add another polymer precipitant, resulting in a rise of running cost. Thus, it has been found that the treatment as shown in FIG. 3, namely the silver-containing solution A is subjected to a silver-recovery treatment, mixed with a silver-free solution B and then subjected to the activated sludge treatment C, was effective with respect to running cost.

EXAMPLE 18

According to FIG. 1(a) showing a silver-recovery process in the disposal of waste water from a factory for silver halides, the experiment (1) in Example 2 was carried out using an emulsion-containing waste solution (Ag concentration: 153 ppm). Thus, the silver was removed from the waste water to achieve the Ag concentration reduced to 5.4 ppm.

To the supernatant obtained above, EPL-2 was added in an amount of 30 mg/liter, and stirred for 2 minutes, followed by one day's standing. The Ag concentration in the thus obtained supernatant was determined to be 0.007 ppm by atomic absorptiometry. The amount of EPL-2 added therein corresponds to about 1/30 the total concentration of silver (the sum of silver halide and silver concentrations: 153 ppm).

EXAMPLE 19

In accordance with FIG. 1(a) showing a silver-recovery process in the disposal of waste water from a factory for silver halides, to an emulsion-containing waste solution (Ag concentration: 135 ppm) were added dicyandiamide-formaldehyde condensate and polydimethylaminoethylmethacrylate methyl chloride quaternary salt in amounts of 40 mg and 120 mg respectively per liter of the waste solution. The resulting solution was stirred with a stirrer for 3 minutes, admixed with 5 mg of a terpolymer of acrylamide, sodium acrylate and sodium 2-acrylamido-2-methylpropanesulfonate, stirred with a stirrer for 2 minutes, and then allowed to stand for 3 hours. Silver in the thus obtained supernatant was analyzed to give the Ag concentration of 1.2 ppm.

To this supernatant, EPL-1 produced by Miyoshi Oil & Fat Co., Ltd. was added in an amount of 13 ml per liter of waste solution, stirred with a stirrer for 2 minutes, allowed to stand for one day, and underwent silver analysis. As a result of the analysis, the Ag concentration was found to be 0.003 ppm.

The amount of EPL-1 added therein corresponds to about 1/130 the total concentration of silver.

EXAMPLE 20

In addition to the experiment in Example 18, 60 mg of an organic polymer precipitant (Sanpoly) was added to cause the separation of silver through precipitation. Thus, the Ag concentration of 0.02 ppm was achieved.

Therein, the Ag concentration was reduced to 0.001 ppm by increasing the amount of EPL-2 up to 60 mg/liter.

More specifically, solid silver in the emulsion-containing waste solution, including silver halide and colloidal silver, was settled in the pre-sedimentation process (the experiment (2) in Example 2), and then ionic silver (e.g., $AgX_n^-$ (20>n≧3: X=Cl, Br, I) and $AgY_m^-$(20>m≧2: $Y=S_2O_3^{-2}$, $SO_3^{-2}$)) was precipitated with the S-containing hydrophilic polymer chelating agent. When hitherto known organic polymer and/or inorganic precipitants were further added simultaneously with or subsequently to the addition of the foregoing chelating agent, silver was removed to an undetectable extent at a low cost.

In accordance with the present invention, the silver-removing methods which can ensure excellent ability to remove silver and reduction in equipment cost are provided. More specifically, the silver can be removed from a solution containing both silver halide and silver ion to reduce the Ag concentration to several ppm, if needed, even to 0.001 ppm.

While the invention has been described in detail and with reference to specific embodiments thereof, it will be apparent to one skilled in the art that various changes and modifications can be made therein without departing from the spirit scope thereof.

What is claimed is:

1. A method of removing silver, comprising adding, into a solution which is generated in the step of producing a photosensitive material and contains silver halide and silver ion, a water-soluble sulfur atom-containing hydrophilic polymer chelating agent wherein said chelating agent is represented by the general formula I,

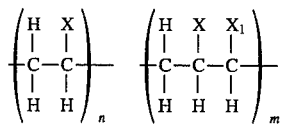

wherein one of the substituents X and $X_1$ is —SM, —NHCOSM, —$NHCS_2M$ or —$CH_2NHCS_2M$, and the other is H; M is Li, Na, K or H; 0≦n≦30,000; 0≦m≦30,000; and n+m>100 and wherein said chelating agent has a molecular weight in a range of from 50,000 to 500,000 and containing at least one group selected from the group consisting of a dithiocarbamate group, a dithiocarbaminic acid group, and a thiol group.

2. A method of removing silver as described in claim 1, wherein the silver is removed by adding an anionic, nonionic or cationic organic polymer precipitant or a combination thereof before, after or during the addition of the sulfur atom-containing hydrophilic polymer chelating agent.

3. A method of removing silver as described in claim 1, wherein the silver is removed by adding an inorganic salt or metallic precipitant under a controlled pH before, after or during the addition of the sulfur atom-containing hydrophilic polymer chelating agent.

4. A method of removing silver as described in claim 1, wherein the solution containing silver halide and silver ion undergoes pre-sedimentation with an inorganic precipitant and/or an organic polymer precipitant, the supernatant is separated therefrom, and then the sulfur atom-containing hydrophilic polymer chelating agent is added to the supernatant in an amount of from 1/100 to 1/100 equivalent with respect to the molar amount of whole silver in the supernatant, thereby removing the silver.

5. A method of removing silver, comprising a step of feeding a solution containing silver halide and silver ion into an activated sludge tank and a step of adding a sulfur atom-containing hydrophilic polymer chelating agent, during or subsequently to the treatment with the activated sludge, said sulfur atom-containing hydrophilic polymer chelating agent being a water-soluble sulfur atom-containing hydrophilic polymer chelating agent which contains at least one group selected from among a dithiocarbamate group, a thiocarboxyl group, a dithiocarboxyl group, a dithiocarbaminic acid group and a thiol group.

6. A method of removing silver as described in the claim 6, wherein the solution containing silver halide and silver ion is fed into the activated sludge tank and an inorganic precipitant and/or an organic polymer precipitant is added before or during the treatment with activated sludge.

7. A method of removing silver, comprising a step of feeding a solution containing silver halide and silver ion into an activated sludge tank and a step of passing the solution through a single membrane MF filter during or continuously to the treatment with activated sludge.

8. A method of removing silver as described in claim 7, wherein the single membrane MF filter has an average pore diameter of 0.05 to 1 µm, at least 75% of the filter membrane surface is not fixed, thereby rendering the filtering plane vibratile, and the silver is removed under a low pressure of 1 Kg/cm$^2$ or less.

9. A method of removing silver as described in claim 7, wherein after feeding the solution containing silver halide and silver ion into the activated sludge tank and treating it with the activated sludge, the supernatant of the treated solution is sterilized and then passed through the single membrane MF filter.

10. A method of removing silver as described in claim 1, wherein after precipitating and separating out the silver by the addition of the sulfur atom-containing hydrophilic polymer chelating agent, the solution separated is filtered under a low pressure of 1 Kg/cm$^2$ or less by passing it through a single membrane MF filter which has a pore diameter of from 0.05 to 1 µm and a membrane surface at least 75% of which is unfixed to render the filtering plane vibratile.

11. A method of removing silver from a quantity of waste solution, comprising a step of adding a sulfur atom-containing hydrophilic polymer chelating agent to a solution containing silver halide and silver ion to precipitate and separate out silver, treating the resulting solution with activated sludge and then filtering through a single membrane MF filter under a low pressure of 1 Kg/cm$^2$ or less, said sulfur atom-containing hydrophilic polymer chelating agent being a water-soluble sulfur atom-containing hydrophilic polymer chelating agent which contains at least one group selected from among a dithiocarbamate group, a thiocarboxyl group, a dithiocarboxyl group, a dithiocarbaminic acid group and a thiol group.

* * * * *